(12) United States Patent
Jin et al.

(10) Patent No.: US 12,542,492 B2
(45) Date of Patent: Feb. 3, 2026

(54) POWER CONVERSION MODULE WITH VOLTAGE REDUCTION FUNCTION AND ELECTRONIC DEVICE WITH SAME

(71) Applicant: Delta Electronics, Inc., Taoyuan (TW)

(72) Inventors: Da Jin, Shanghai (CN); Yahong Xiong, Shanghai (CN); Litao Qian, Shanghai (CN); Qinghua Su, Shanghai (CN)

(73) Assignee: Delta Electronics, Inc., Taoyuan (TW)

( * ) Notice: Subject to any disclaimer, the term of this patent is extended or adjusted under 35 U.S.C. 154(b) by 498 days.

(21) Appl. No.: 18/092,854

(22) Filed: Jan. 3, 2023

(65) Prior Publication Data
US 2023/0246554 A1 Aug. 3, 2023

(30) Foreign Application Priority Data
Jan. 28, 2022 (CN) .......................... 202210106338.X

(51) Int. Cl.
*H02M 3/335* (2006.01)
*H02M 1/00* (2007.01)

(52) U.S. Cl.
CPC ..... *H02M 3/33569* (2013.01); *H02M 1/0064* (2021.05)

(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS

2010/0232181 A1* 9/2010 Nakahori ............ H01F 27/2804
  336/221
2014/0340940 A1* 11/2014 Ouyang .................. H01F 27/28
  336/170
(Continued)

FOREIGN PATENT DOCUMENTS

CN 1504014 B 5/2010
CN 101141096 B 12/2011
(Continued)

OTHER PUBLICATIONS

English Translation of CN 115189551 (Year: 2021).*

*Primary Examiner* — Sean Kayes
*Assistant Examiner* — Nusrat Quddus
(74) *Attorney, Agent, or Firm* — KIRTON McCONKIE; Evan R. Witt

(57) ABSTRACT

A power conversion module includes a first bridge arm, a second bridge arm, a transformer and a rectifying circuit. An output positive terminal and an output negative terminal are electrically connected with a low-voltage and high-current load. The first bridge arm and the second bridge arm are electrically connected between an input positive terminal and an input negative terminal. The transformer includes a primary winding, a first secondary winding and a second secondary winding. The two terminals of the primary winding are electrically connected with a midpoint of the first bridge arm and a midpoint of the second bridge arm. An output inductor of the rectifying circuit is electrically connected between the winding midpoint and the output positive terminal. The input voltage is higher than 40V. The output voltage is lower than or equal to 2.2V.

20 Claims, 7 Drawing Sheets

(58) Field of Classification Search
CPC ............... H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; Y02B 70/1491; H01F 3/14

See application file for complete search history.

(56) References Cited

U.S. PATENT DOCUMENTS

| | | | | |
|---|---|---|---|---|
| 2015/0221432 A1* | 8/2015 | Zhou | ................. | H01F 27/40 |
| | | | | 361/679.01 |
| 2021/0272737 A1* | 9/2021 | Jin | ................. | H05K 1/165 |
| 2022/0006394 A1* | 1/2022 | Jin | ................. | H02M 7/003 |
| 2022/0051842 A1* | 2/2022 | Chang | ................. | H02M 3/335 |
| 2022/0230798 A1* | 7/2022 | Xiong | ................. | H01F 27/24 |
| 2022/0293334 A1* | 9/2022 | Jin | ................. | H01F 3/14 |
| 2022/0294339 A1* | 9/2022 | Xiong | ................. | H05K 1/181 |
| 2022/0319759 A1* | 10/2022 | Jin | ................. | H02M 3/33571 |
| 2022/0321017 A1* | 10/2022 | Jin | ................. | H02M 1/0064 |
| 2022/0352826 A1* | 11/2022 | Leng | ................. | H02M 3/33571 |
| 2023/0187115 A1* | 6/2023 | Jin | ................. | H02M 3/003 |
| | | | | 336/192 |
| 2023/0223186 A1* | 7/2023 | Jin | ................. | H01F 27/2804 |
| | | | | 336/185 |
| 2023/0238173 A1* | 7/2023 | Jin | ................. | H01F 27/306 |
| | | | | 336/212 |
| 2023/0274870 A1* | 8/2023 | Chang | ................. | H01F 27/306 |
| | | | | 336/212 |
| 2024/0047126 A1* | 2/2024 | Jin | ................. | H02M 3/33576 |
| 2024/0146187 A1* | 5/2024 | Wang | ................. | H01F 27/24 |
| 2024/0242871 A1* | 7/2024 | Zeng | ................. | H01F 27/292 |

FOREIGN PATENT DOCUMENTS

| | | | | |
|---|---|---|---|---|
| CN | 203859683 U | 10/2014 | | |
| CN | 103636108 B | 10/2016 | | |
| CN | 110993279 B | 8/2021 | | |
| CN | 115189551 A | * 10/2022 | ............. | H02M 1/32 |
| TW | I278875 B | 4/2007 | | |

* cited by examiner

POWER CONVERSION MODULE WITH VOLTAGE REDUCTION FUNCTION AND ELECTRONIC DEVICE WITH SAME

CROSS-REFERENCE TO RELATED APPLICATION

This application claims priority to China Patent Application No. 202210106338.X, filed on Jan. 28, 2022. The entire content of the above-mentioned patent application is incorporated herein by reference for all purposes.

FIELD OF THE INVENTION

The present disclosure relates to a power conversion module and an electronic device, and more particularly to a power conversion module with two output inductors and an electronic device.

BACKGROUND OF THE INVENTION

With the advancement of Internet, cloud computing technologies, electric vehicle technologies, industrial automation technologies and associated technologies, the demands for electric power gradually increase. In other words, the demands for power sources are also increased. Consequently, the electronic device has to be developed toward high power density and high efficiency. In order to meet the power requirements of high efficiency and high power density, the current industry practice is to increase the bus voltage in the electronic device (e.g., a power conversion module) from 12V to 48V. Consequently, the current loss on the bus and the cost of the bus are reduced.

In case that the input voltage is 48V, two approaches are used to achieve the purpose of power conversion. In accordance with the first approach, a power conversion module with two stage converters (e.g., a fixed-ratio converter and a buck converter) is employed. However, the efficiency of the power conversion module with two stage converters is low, and the applications thereof are limited.

In accordance with the second approach, a single-stage converter is used. The single-stage converter includes a half-bridge current-doubling rectifier circuit with discrete magnetic elements or a half-bridge current-doubling rectifier circuit with an integrated magnetic element. The power conversion module with the single-stage converter has higher conversion efficiency and higher power density. However, the inductance of the output inductor of the power conversion module is large, and the dynamic properties of the power conversion module are not satisfied.

Therefore, there is a need of providing an improved power conversion device and an electronic device with the power conversion module in order to overcome the drawbacks of the conventional technologies.

SUMMARY OF THE INVENTION

An object of the present disclosure provides a power conversion module with a voltage reduction function.

Another object of the present disclosure provides an electronic device with the power conversion module.

In accordance with an aspect of the present disclosure, a power conversion module is provided. The power conversion module includes an input positive terminal, an input negative terminal, an output positive terminal, an output negative terminal, a first bridge arm, a second bridge arm, a transformer and a first rectifying circuit. The output positive terminal and the output negative terminal are electrically connected with a low-voltage and high-current load. The power conversion module receives an input voltage through the input positive terminal and the input negative terminal. An output voltage is outputted from the output positive terminal and the output negative terminal to drive the low-voltage and high-current load. The first bridge arm is electrically connected between the input positive terminal and the input negative terminal. The second bridge arm is electrically connected between the input positive terminal and the input negative terminal. The first bridge arm and the second bridge arm are connected with each other in parallel. The transformer includes a primary winding, a first secondary winding and a second secondary winding. A first terminal of the primary winding is electrically connected with a midpoint of the first bridge arm. A second terminal of the primary winding is electrically connected with a midpoint of the second bridge arm. A second terminal of the first secondary winding and a second terminal of the second secondary winding are electrically connected with a first winding midpoint. The first rectifying circuit includes a first rectifying switch, a second rectifying switch and a first output inductor. A drain terminal of the first rectifying switch is electrically connected with a first terminal of the first secondary winding. A drain terminal of the second rectifying switch is electrically connected with a first terminal of the second secondary winding. A source terminal of the first rectifying switch and a source terminal of the second rectifying switch are connected with each other and electrically connected with the output negative terminal. The first output inductor is electrically connected between the first winding midpoint and the output positive terminal. A magnitude of the input voltage is higher than 40V, and a magnitude of the output voltage is lower than or equal to 2.2V.

In accordance with another aspect of the present disclosure, an electronic device is provided. The electronic device includes a power conversion module and a load. The power conversion module includes an input positive terminal, an input negative terminal, an output positive terminal and an output negative terminal, a first bridge arm, a second bridge arm, a transformer and a first rectifying circuit. The power conversion module receives an input voltage through the input positive terminal and the input negative terminal, and an output voltage is outputted from the output positive terminal and the output negative terminal. The first bridge arm is electrically connected between the input positive terminal and the input negative terminal. The second bridge arm is electrically connected between the input positive terminal and the input negative terminal. The first bridge arm and the second bridge arm are connected with each other in parallel. The transformer includes a primary winding, a first secondary winding and a second secondary winding. A first terminal of the primary winding is electrically connected with a midpoint of the first bridge arm, a second terminal of the primary winding is electrically connected with a midpoint of the second bridge arm, and a second terminal of the first secondary winding and a second terminal of the second secondary winding are electrically connected with a first winding midpoint. The first rectifying circuit includes a first rectifying switch, a second rectifying switch and a first output inductor. The drain terminal of the first rectifying switch is electrically connected with a first terminal of the first secondary winding, a drain terminal of the second rectifying switch is electrically connected with a first terminal of the second secondary winding, a source terminal of the first rectifying switch and a source terminal of the second rectifying switch are connected with each other and electrically connected with the output negative terminal, and the first output inductor is electrically connected between the first winding midpoint and the output positive terminal. A magnitude of the input voltage is higher than 40V, and a magnitude of the output voltage is lower than or equal to 2.2V. A load is electrically connected with the output positive terminal and the output negative terminal of the power conversion module and configured to receive the output voltage outputted from the output positive terminal and the output negative terminal.

The present disclosure provides a power conversion module. The input voltage with high power (e.g., a 48V input voltage) is decreased to the output voltage with low power (e.g., 2.2V output voltage) by the power conversion module. Moreover, the volume of the power conversion module is effectively reduced, and the integration of the power conversion module is enhanced. Consequently, the power conversion module has the advantages of low output ripple, small volume, high efficiency and simplified applications.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
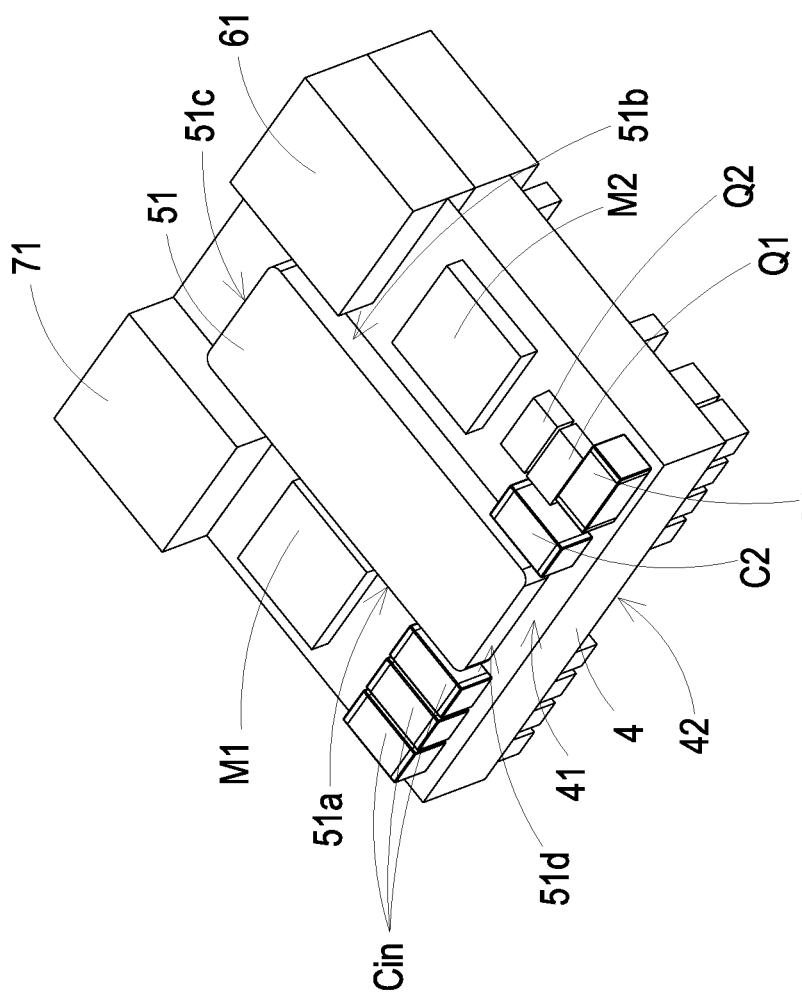
FIG. 1A is a schematic perspective view illustrating the structure of a power conversion module according to an embodiment of the present disclosure.
Figure 1B:
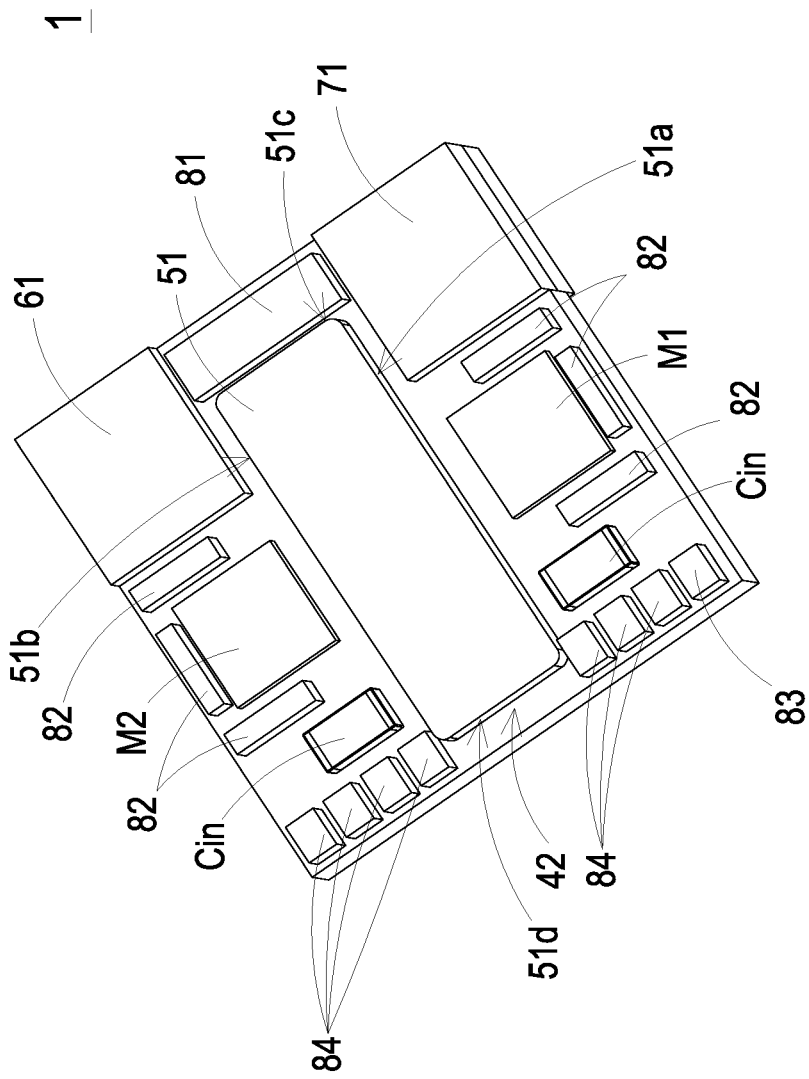
FIG. 1B is a schematic perspective view illustrating the structure of the power conversion module as shown in FIG. 1A and taken along another viewpoint.
Figure 1C:
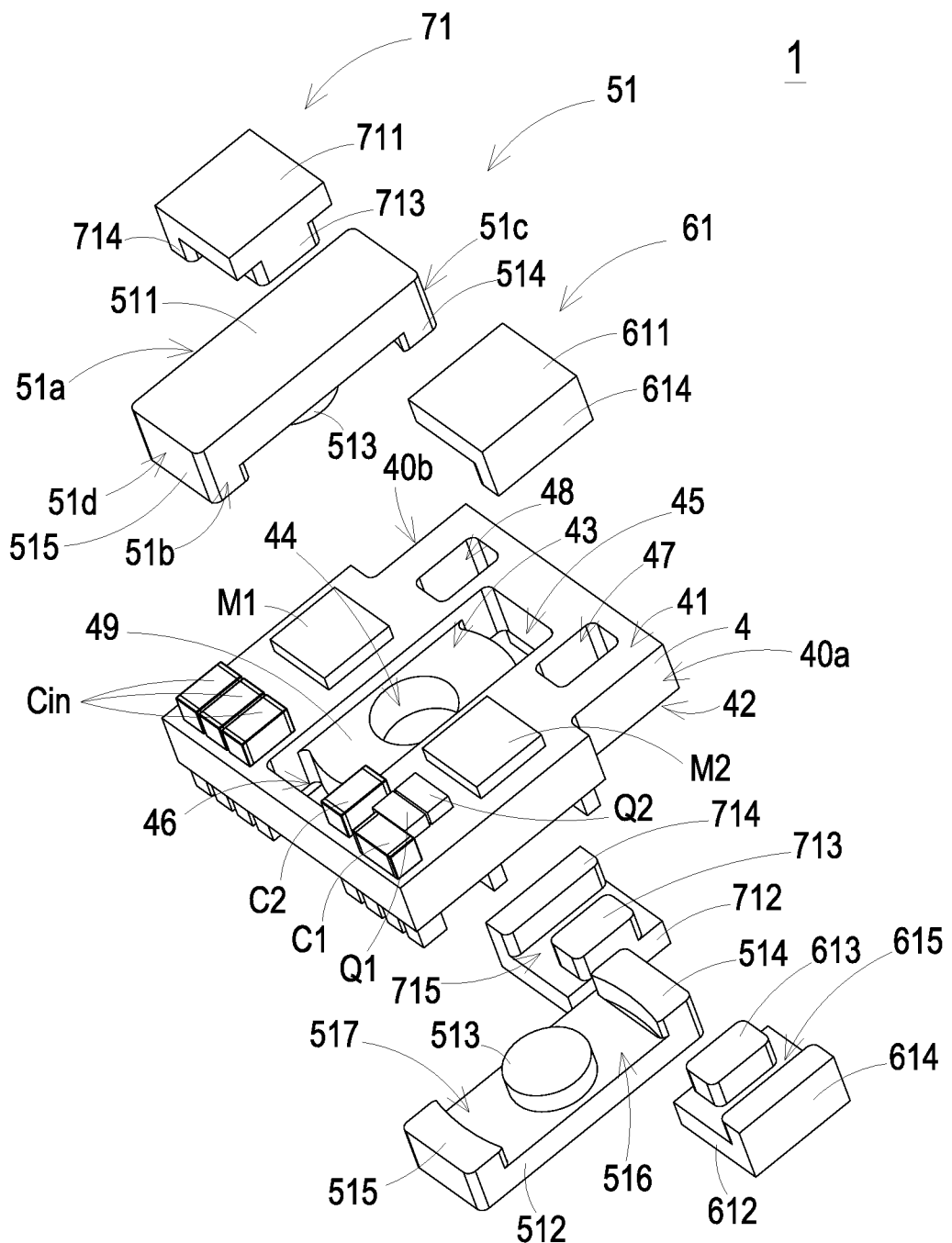
FIG. 1C is a schematic exploded view illustrating the power conversion module as shown in FIG. 1A.
Figure 2:
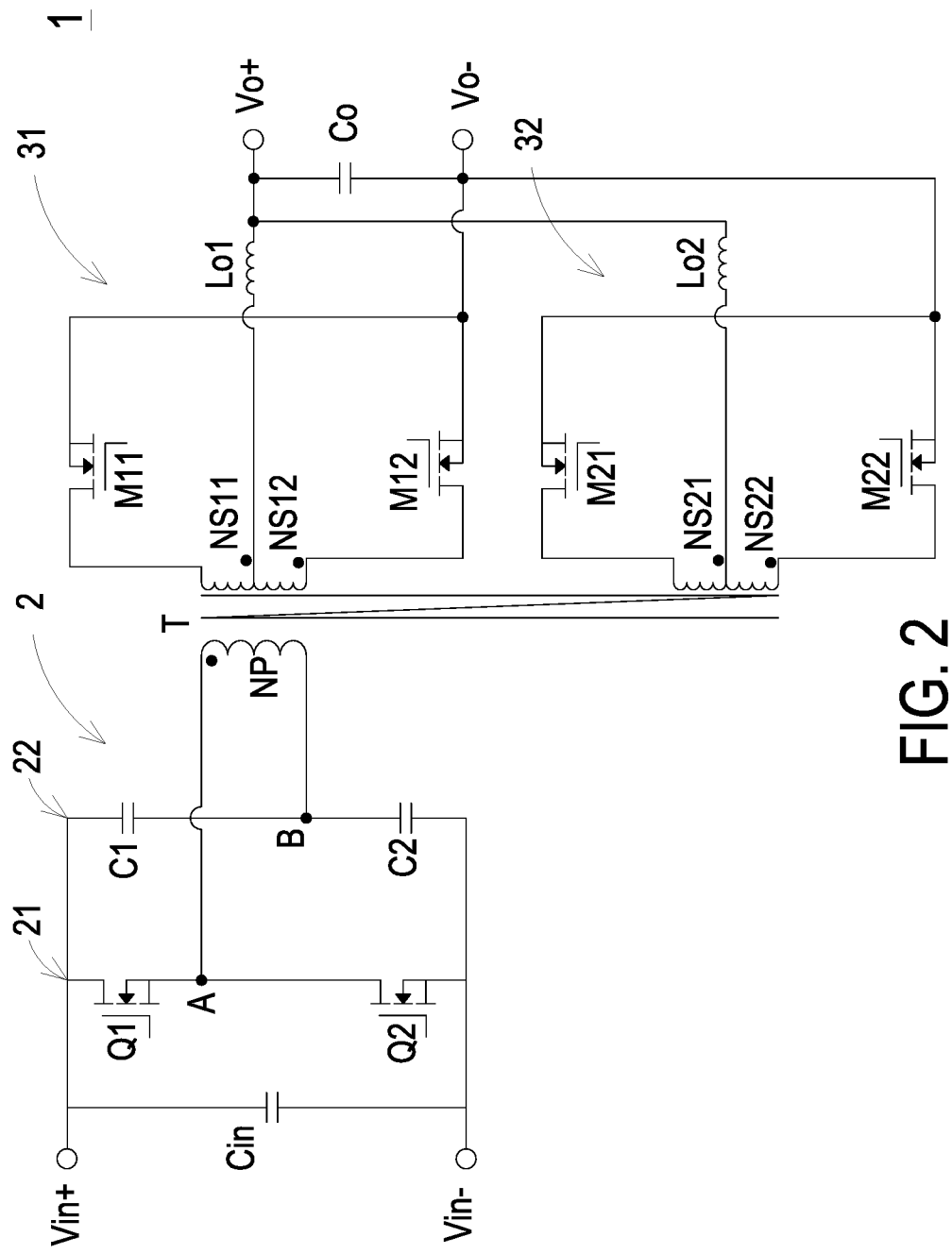
FIG. 2 is a schematic circuit diagram illustrating the circuitry topology of the power conversion module as shown in FIG. 1A.
Figure 3:
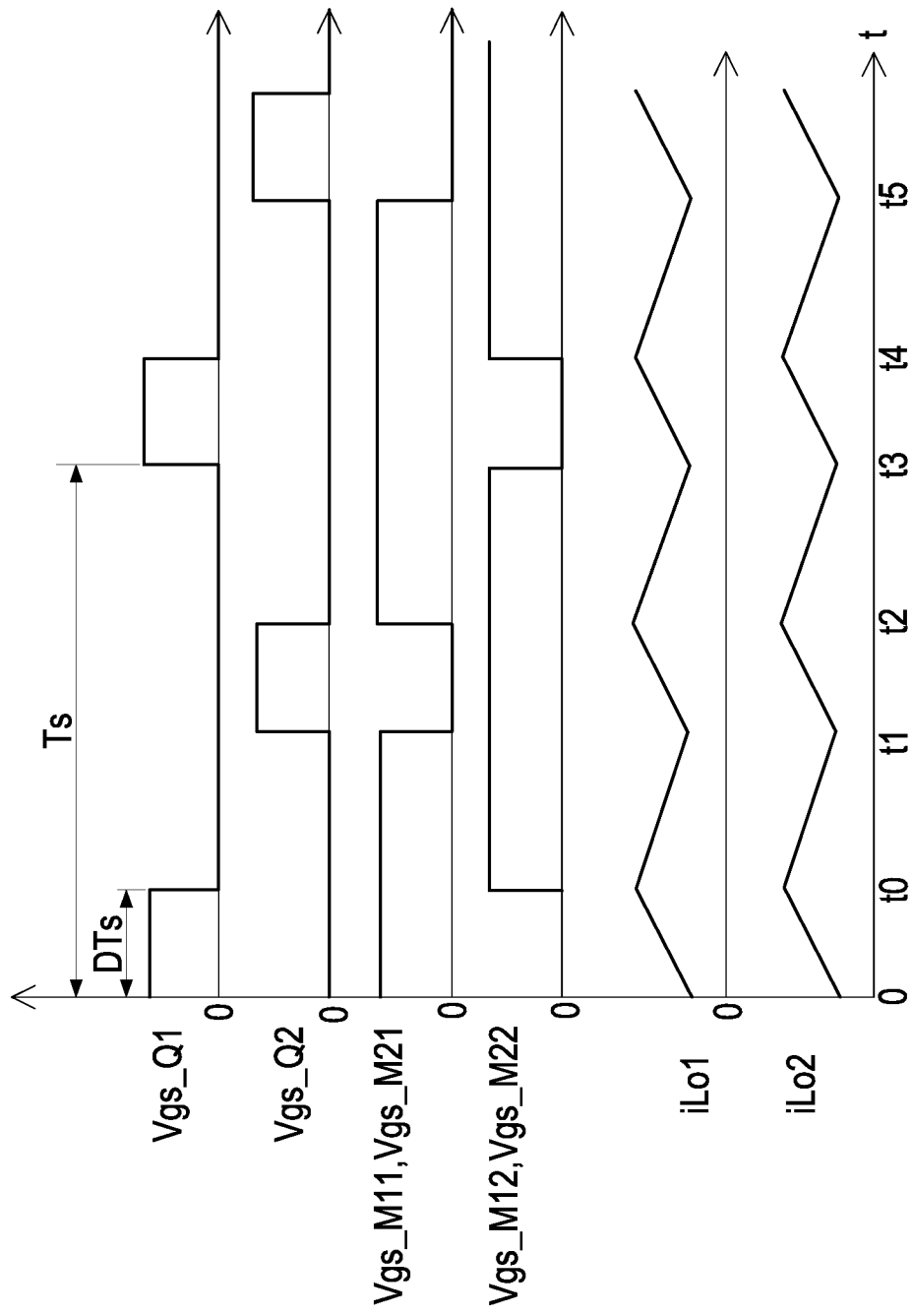
FIG. 3 is a schematic timing waveform diagram illustrating associated voltage signals of the power conversion module as shown in FIG. 1A.
Figure 4:
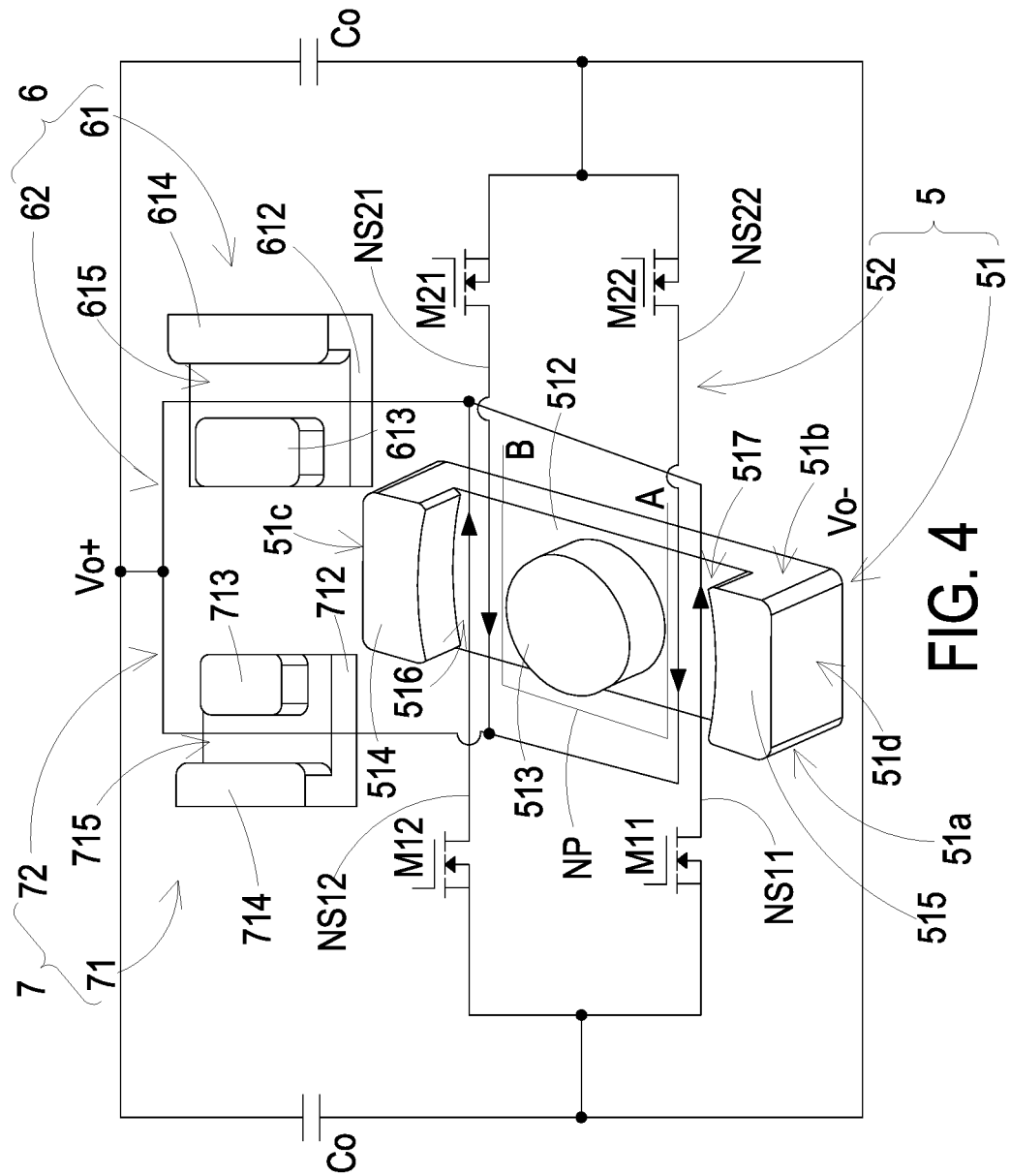
FIG. 4 schematically illustrates magnetic core assemblies and winding assemblies in the power conversion module as shown in FIG. 1A, in which the upper magnetic covers are not shown.

Please refer to FIGS. 1A, 1B, 1C, 2, 3 and 4. FIG. 1A is a schematic perspective view illustrating the structure of a power conversion module according to an embodiment of the present disclosure. FIG. 1B is a schematic perspective view illustrating the structure of the power conversion module as shown in FIG. 1A and taken along another viewpoint. FIG. 1C is a schematic exploded view illustrating the power conversion module as shown in FIG. 1A. FIG. 2 is a schematic circuit diagram illustrating the circuitry topology of the power conversion module as shown in FIG. 1A. FIG. 3 is a schematic timing waveform diagram illustrating associated voltage signals of the power conversion module as shown in FIG. 1A. FIG. 4 schematically illustrates magnetic core assemblies and winding assemblies in the power conversion module as shown in FIG. 1A, in which the upper magnetic covers are not shown.

The present disclosure provides a power conversion module 1. As shown in FIG. 2, the power conversion module 1 includes an input positive terminal Vin+, an input negative terminal Vin−, an output positive terminal Vo+, an output negative terminal Vo−, a switching circuit 2, a transformer T, a first rectifying circuit 31, a second rectifying circuit 32 and an output capacitor Co.

The power conversion module 1 receives an input voltage Vin through the input positive terminal Vin+ and the input negative terminal Vin−. Preferably but not exclusively, the magnitude of the input voltage Vin is higher than 40V. The output positive terminal Vo+ and the output negative terminal Vo− are electrically connected with a load (not shown). Moreover, the load is a low-voltage and high-current load. An output voltage Vo is provided from the power conversion module 1 to the load through the output positive terminal Vo+ and the output negative terminal Vo−. Preferably but not exclusively, the magnitude of the output voltage Vo is lower than or equal to 2.2V, or even lower than or equal to 1.2V. The rated current provided from the power conversion module 1 to the load through the output positive terminal Vo+ and the output negative terminal Vo− is higher than or equal to 50 A.

The switching circuit 2 includes an input capacitor Cin, a switch bridge arm 21 and a capacitor bridge arm 22. The first terminal of the input capacitor Cin is electrically connected with the input positive terminal Vin+. The second terminal of the input capacitor Cin is electrically connected with the input negative terminal Vin−. In practice, the input capacitor Cin includes one input capacitor Cin or a plurality of input capacitors Cin. For succinctness, only one input capacitor Cin is shown in FIG. 2. The switch bridge arm 21 and the capacitor bridge arm 22 are collaboratively formed as a bridge type circuit. The switch bridge arm 21 is electrically connected between the input positive terminal Vin+ and the input negative terminal Vin−. In addition, the switch bridge arm 21 and the input capacitor Cin are connected with each other in parallel. The switch bridge arm 21 includes an upper switch Q1 and a lower switch Q2. The upper switch Q1 and the lower switch Q2 are connected with a midpoint A of the switch bridge arm 21. Preferably but not exclusively, the upper switch Q1 and the lower switch Q2 are MOSFET switches, SiC switches or GaN switches. The capacitor bridge arm 22 is electrically connected between the input positive terminal Vin+ and the input negative terminal Vin−. In addition, the capacitor bridge arm 22 and the switch bridge arm 21 are connected with each other in parallel. The capacitor bridge arm 22 includes a first capacitor C1 and a second capacitor C2. The first capacitor C1 and the second capacitor C2 are connected with each other. Moreover, the first capacitor C1 and the second capacitor C2 are connected with a midpoint B of the capacitor bridge arm 22.

The transformer T includes a primary winding NP, a first secondary winding NS11, a second secondary winding NS12, a third secondary winding NS21 and a fourth secondary winding NS22. The primary winding NP is connected between the midpoint A of the switch bridge arm 21 and the midpoint B of the capacitor bridge arm 22. That is, the first terminal of the primary winding NP is electrically connected with the midpoint A of the switch bridge arm 21, and the second terminal of the primary winding NP is electrically connected with the midpoint B of the capacitor bridge arm 22. The first terminal of the primary winding NP is a dotted terminal. The second terminal of the primary winding NP is an undotted terminal. The primary winding NP and the switching circuit 2 are collaboratively formed as a primary circuit of the power conversion module 1. The primary winding NP is wound for N turns. For example, the primary winding NP is wound for one turn.

The first secondary winding NS11 and the second secondary winding NS12 are connected in series. The first secondary winding NS11 and the second secondary winding NS12 are magnetically coupled with the primary winding NP. The second terminal of the first secondary winding NS11 and the second terminal of the second secondary winding NS12 are electrically connected with a first winding midpoint. The polarity of the second terminal of the first secondary winding NS11 and the polarity of the second terminal of the second secondary winding NS12 are opposite. The polarity of the first terminal of the first secondary winding NS11 and the polarity of the second terminal of the second secondary winding NS12 are opposite to the polarity of the first terminal (i.e., the dotted terminal) of the primary winding NP. The polarity of the second terminal of the first secondary winding NS11 and the polarity of the first terminal of the second secondary winding NS12 are identical to the polarity of the first terminal (i.e., the dotted terminal) of the primary winding NP. Moreover, each of the first secondary winding NS11 and the second secondary winding NS12 is wound for 0.5, 1 or M turns. In the embodiment, each of the first secondary winding NS11 and the second secondary winding NS12 is wound for 0.5 turn.

The first rectifying circuit 31 includes a first rectifying switch M11, a second rectifying switch M12 and a first output inductor Lo1. The drain terminal of the first rectifying switch M11 is electrically connected with the first terminal of the first secondary winding NS11. The drain terminal of the second rectifying switch M12 is electrically connected with the first terminal of the second secondary winding NS12. The source terminal of the first rectifying switch M11 and the source terminal of the second rectifying switch M12 are connected with each other and electrically connected with the output negative terminal Vo−. The first output inductor Lo1 is electrically connected between the first winding midpoint and the output positive terminal Vo+. Moreover, the first secondary winding NS11, the second secondary winding NS12 and the first rectifying circuit 31 are collaboratively formed as a first secondary circuit of the power conversion module 1.

The third secondary winding NS21 and the fourth secondary winding NS22 are connected in series. The third secondary winding NS21 and the fourth secondary winding NS22 are magnetically coupled with the primary winding NP. The second terminal of the third secondary winding NS21 and the second terminal of the fourth secondary winding NS22 are electrically connected with a second winding midpoint. The polarity of the second terminal of the third secondary winding NS21 and the polarity of the second terminal of the fourth secondary winding NS22 are opposite. The polarity of the first terminal of the third secondary winding NS21 and the polarity of the second terminal of the fourth secondary winding NS22 are opposite to the polarity of the first terminal (i.e., the dotted terminal) of the primary winding NP. The polarity of the second terminal of the third secondary winding NS21 and the polarity of the first terminal of the fourth secondary winding NS22 are identical to the polarity of the first terminal (i.e., the dotted terminal) of the primary winding NP. Moreover, each of the third secondary winding NS21 and the fourth secondary winding NS22 is wound for 0.5, 1 or M turns. In the embodiment, each of the third secondary winding NS21 and the fourth secondary winding NS22 is wound for 0.5 turn.

The second rectifying circuit 32 includes a third rectifying switch M21, a fourth rectifying switch M22 and a second output inductor Lo2. The drain terminal of the third rectifying switch M21 is electrically connected with the first terminal of the third secondary winding NS21. The drain terminal of the fourth rectifying switch M22 is electrically connected with the first terminal of the fourth secondary winding NS22. The source terminal of the third rectifying switch M21 and the source terminal of the fourth rectifying switch M22 are connected with each other and electrically connected with the output negative terminal Vo−. The second output inductor Lo2 is electrically connected between the second winding midpoint and the output positive terminal Vo+. The output positive terminal Vo+ is electrically connected with the first terminal of the output capacitor Co. The second terminal of the output capacitor Co is electrically connected with the source terminal of the third rectifying switch M21 and the source terminal of the fourth rectifying switch M22, i.e., the output negative terminal Vo− of the power conversion module 1. In addition, the third secondary winding NS21, the fourth secondary winding NS22 and the second rectifying circuit 32 are collaboratively formed as a second secondary circuit of the power conversion module 1.

In an embodiment, the first rectifying switch M11, the second rectifying switch M12, the third rectifying switch M21 and the fourth rectifying switch M22 are MOSFET switches, SiC switches, GaN switches or diodes.

The output capacitor Co is electrically connected between the output positive terminal Vo+ and the output negative terminal Vo−.

In an embodiment, each of the first secondary winding NS11, the second secondary winding NS12, the third secondary winding NS21 and the fourth secondary winding NS22 includes a plurality of windings connected in parallel. In addition, each of the first rectifying switch M11, the second rectifying switch M12, the third rectifying switch M21 and the fourth rectifying switch M22 includes a plurality of switches connected in parallel.

In an embodiment, the power conversion module 1 further includes a plurality of driving circuits (not shown) and a control circuit (not shown). Preferably, the number of the driving circuits is equal to the number of the switches. For example, the power conversion module 1 includes six driving circuits. The six driving circuits are electrically connected with the upper switch Q1, the lower switch Q2, the first rectifying switch M11, the second rectifying switch M12, the third rectifying switch M21 and the fourth rectifying switch M22, respectively. The control circuit is electrically connected with the six driving circuits. The control circuit generates a plurality of PWM signals. According to each PWM signal, the driving circuit generates the corresponding driving signal to drive the corresponding switch. The on/off states of the switches are controlled according to the corresponding driving signals. Consequently, the input voltage Vin is decreased to the output voltage Vo. The operation of the power conversion module 1 will be described as follows by referring to the waveform diagram of the driving signals for driving the corresponding switches.

Please refer to FIGS. 2 and 3. In FIG. 3, VGS_Q1 denotes the gate-source voltage of the upper switch Q1, VGS_Q2 denotes the gate-source voltage of the lower switch Q2, VGS_M11 denotes the gate-source voltage of the first rectifying switch M11, VGS_M12 denotes the gate-source voltage of the second rectifying switch M12, VGS_M21 denotes the gate-source voltage of the third rectifying switch M21, and VGS_M22 denotes the gate-source voltage of the fourth rectifying switch M22. Moreover, iLo1 denotes the current flowing through the first output inductor Lo1, and iLo2 denotes the current flowing through the second output inductor Lo2.

Please refer to FIG. 3 again. The upper switch Q1 receives a first driving signal. The waveform of the first driving signal matches the gate-source voltage VGS_Q1 of the upper switch Q1. The lower switch Q2 receives a second driving signal. The waveform of the second driving signal matches the gate-source voltage VGS_Q2 of the lower switch Q2. The duty cycle of the first driving signal and the duty cycle of the second driving signal are equal. In addition, the phase difference between the first driving signal and the second driving signal is 180 degrees.

Each of the first rectifying switch M11 and the third rectifying switch M21 receives a third driving signal. The on/off states of the first rectifying switch M11 and the on/off states of the third rectifying switch M21 are controlled according to the third driving signal. The waveform of the third driving signal matches the gate-source voltage VGS_M11 of the first rectifying switch M11 and the gate-source voltage VGS_M21 of the third rectifying switch M21. As mentioned above, the first secondary winding NS11 is connected with the first rectifying switch M11, and the third rectifying switch M21 is connected with the third secondary winding NS21. Consequently, the frequency and the phase of the terminal voltage across the two terminals of the first secondary winding NS11 and the frequency and the phase of the terminal voltage across the two terminals of the third secondary winding NS21 are identical. The third driving signal and the second driving signal are complementary to each other.

Each of the second rectifying switch M12 and the fourth rectifying switch M22 receives a fourth driving signal. The on/off states of the second rectifying switch M12 and the on/off states of the fourth rectifying switch M22 are controlled according to the fourth driving signal. The waveform of the fourth driving signal matches the gate-source voltage VGS_M12 of the second rectifying switch M12 and the gate-source voltage VGS_M22 of the fourth rectifying switch M22. As mentioned above, the second secondary winding NS12 is connected with the second rectifying switch M12, and the fourth rectifying switch M22 is connected with the fourth secondary winding NS22. Consequently, the frequency and the phase of the terminal voltage across the two terminals of the second secondary winding NS12 and the frequency and the phase of the terminal voltage across the two terminals of the fourth secondary winding NS22 are identical. The fourth driving signal and the first driving signal are complementary to each other.

The switching frequency of the first driving signal for driving the upper switch Q1 is fsw, the switching frequency of the second driving signal for driving the lower switch Q2 is fsw, the duty cycle of the first driving signal is DTs, and the duty cycle of the second driving signal is DTs. According to the above control mechanism, the voltage VAB between the midpoint A of the switch bridge arm 21 and the midpoint B of the capacitor bridge arm 22 is a three-level AC voltage. That is, the voltage VAB has three voltage levels, including +Vin/2, 0 and −Vin/2. The first output capacitor Lo1 and the output capacitor Co are collaboratively formed as a first output filtering circuit. The first output filtering circuit receives an AC voltage signal. The switching frequency of the AC voltage signal is 2×fw, the duty cycle of the AC voltage signal is 2×DTs, and the amplitude of the AC voltage signal is Vin/(2×K) and 0, wherein K is equal to the result of the turn number of the primary winding NP divided by the turn number of the first secondary winding NS11. For example, if the turn umber of the first secondary winding NS11 is 1, K is equal to the turn number of the primary winding NP. Whereas, if the turn number of the first secondary winding NS11 is 0.5, K is equal to two times the turn number of the primary winding NP.

As mentioned above, the switching frequency of each of the first driving signal and the second driving signal for driving each of the upper switch Q1 and the lower switch Q2 is fsw, and the switching frequency of the AC voltage signal received by the first output filtering circuit of the first output capacitor Lo1 and the output capacitor Co is 2×fw. The duty cycle of each of the first driving signal and the second driving signal is DTs, and the duty cycle of the AC voltage signal received by the first output filtering circuit is 2×DTs. Consequently, the volt-second product withstood by the first output inductor Lo1 is largely reduced. Moreover, the inductor with a smaller inductance can be used as the first output inductor Lo1 to suppress the current ripple.

Similarly, the switching frequency of each of the first driving signal and the second driving signal for driving each of the upper switch Q1 and the lower switch Q2 is fsw, and the switching frequency of the AC voltage signal received by a second output filtering circuit of the second output capacitor Lo2 and the output capacitor Co is 2×fw. The duty cycle of each of the first driving signal and the second driving signal is DTs, and the duty cycle of the AC voltage signal received by the second output filtering circuit is 2×DTs. Consequently, the volt-second product withstood by the second output inductor Lo2 is largely reduced. Moreover, the inductor with a smaller inductance can be used as the second output inductor Lo2 to suppress the current ripple.

From the above descriptions, the load dynamic response speed of the power conversion module 1 is enhanced. In addition, the technology of the present disclosure can be applied to the power conversion module with the higher input voltage and the lower output voltage. For example, the magnitude of the input voltage is higher than 40V, and the magnitude of the output voltage is lower than or equal to 2.2V (or 1.2V).

As shown in FIG. 2, the input terminal of the first secondary circuit and the input terminal of the second secondary circuit are magnetically coupled with the magnetic element of the transformer T. The detailed structure of the magnetic element will be described as follows. The output terminal of the first secondary circuit and the output terminal of the second secondary circuit are connected with the output positive terminal Vo+. Consequently, the first rectifying circuit 31 and the second rectifying circuit 32 are connected with each other in parallel. That is, the serially-connected structure of the first rectifying switch M11 and the first output inductor Lo1 and the serially-connected structure of the second rectifying switch M21 and the second output inductor Lo2 are connected with each other in parallel, and the serially-connected structure of the second rectifying switch M12 and the first output inductor Lo1 and the serially-connected structure of the fourth rectifying switch M22 and the second output inductor Lo2 are connected with each other in parallel. Since the parasitic resistance in the rectifying circuits of the power conversion module 1 is largely reduced, the conversion efficiency of the power conversion module 1 is enhanced.

In a variant example, the capacitor bridge arm 22 is replaced by a second switch bridge arm, and the first capacitor C1 and the second capacitor C2 are respectively replaced by a second upper switch and a second lower switch. The second switch bridge arm is electrically connected between the input positive terminal Vin+ and the input negative terminal Vin−. The second switch bridge arm and the input capacitor Cin are connected with each other in parallel. The second upper switch and the second lower switch are connected with a midpoint of the second switch bridge arm. Preferably but not exclusively, the second upper switch and the second lower switch are MOSFET switches, SiC switches or GaN switches. In other words, the switching circuit 2 includes two switch bridge arms. The methods for driving the switches of the two switch bridge arms are not restricted as long as the voltage VAB has three voltage levels including +Vin/2, 0 and −Vin/2.

In another embodiment, a blocking capacitor is arranged between the midpoint A of the switch bridge arm and the midpoint B of the capacitor bridge arm, or a current-sharing function is provided. Consequently, the DC current will not flow through the region between the midpoint A of the switch bridge arm and the midpoint B of the capacitor bridge arm.

Please refer to FIGS. 1A, 1B, 1C, 2 and 4. The structure of the power conversion module 1 will be described as follows. The power conversion module 1 is disposed on a system board (not shown). The power conversion module 1 includes a circuit board 4, a first magnetic element 5, a second magnetic element 6, a third magnetic element 7, a plurality of rectifying switches (i.e., the first rectifying switch M11, the second rectifying switch M12, the third rectifying switch M21 and the fourth rectifying switch M22), a plurality of input capacitors Cin, the first capacitor C1, the second capacitor C2, the upper switch Q1 and the lower switch Q2. In FIGS. 1A, 1B and 1C, the installation position of the output capacitor Co is not shown. However, the output capacitor Co can be disposed on any position of the circuit board 4 or any position of the system board.

The circuit board 4 includes a first surface 41, a second surface 42, a first concave structure 43, a second concave structure, a first opening 44, a second opening 45, a third opening 46, a fourth opening 47 and a fifth opening 48.

The first surface 41 and the second surface 42 are opposed to each other. The first concave structure 43 is concavely formed in the first surface 41 of the circuit board 4. The second concave structure (not shown) is concavely formed in the second surface 42 of the circuit board 4. The first concave structure 43 and the second concave structure are located at the middle region of the circuit board 4. The first concave structure 43 and the second concave structure are aligned with each other. Moreover, a portion of the circuit board 4 between the first concave structure 43 and the second concave structure is a winding section 49. The first opening 44 runs through the circuit board 4. In addition, the first opening 44 is located at the center position of the circuit board 4 and in communication with the first concave structure 43 and the second concave structure. The second opening 45 runs through the circuit board 4. In addition, the second opening 45 is in communication between the first concave structure 43 and the second concave structure. The third opening 46 runs through the circuit board 4. In addition, the third opening 46 is in communication between the first concave structure 43 and the second concave structure. Moreover, the first opening 44 is arranged between the second opening 45 and the third opening 46. The fourth opening 47 runs through the first surface 41 and the second surface 42 of the circuit board 4. In addition, the fourth opening 47 is located beside a first lateral wall of the second opening 45. The fifth opening 48 runs through the first surface 41 and the second surface 42 of the circuit board 4. In addition, the fifth opening 48 is located beside a second lateral wall of the second opening 45.

In an embodiment, the circuit board 4 further includes a first notch 40*a* and a second notch 40*b*. The first notch 40*a* is concavely formed in a first lateral wall of the circuit board 4. The second notch 40*b* is concavely formed in a second lateral wall of the circuit board 4. The first lateral wall and the second lateral wall are located at two opposite sides of the circuit board 4. Moreover, the first lateral wall and the second lateral wall are arranged between the first surface 41 and the second surface 42 of the circuit board 4.

The first magnetic element 5 is formed as the transformer T as shown in FIG. 2. As shown in FIG. 4, the first magnetic element 5 includes a first magnetic core assembly 51 and a first winding assembly 52. The first winding assembly 52 is disposed within the winding region 49 of the circuit board 4. The first winding assembly 52 is formed by the conductor in the winding region 49 of the circuit board 4. The winding method of the first winding assembly 52 will be described later. In an embodiment, the first magnetic core assembly 51 is made of a high magnetic permeability material such as ferrite. Consequently, the magnetic loss is reduced, and the magnetic inductance is increased.

In an embodiment, the first magnetic core assembly 51 includes a first lateral side 51*a*, a second lateral side 51*b*, a third lateral side 51*c*, a fourth lateral side 51*d*, a first upper magnetic cover 511, a first lower magnetic cover 512, a middle leg 513, a first lateral leg 514, a second lateral leg 515, a first channel 516 and a second channel 517. The first lateral side 51*a* and the second lateral side 51*b* are opposed to each other. The third lateral side 51*c* and the fourth lateral side 51*d* are opposed to each other. In addition, the third lateral side 51*c* and the fourth lateral side 51*d* are arranged between the first lateral side 51*a* and the second lateral side 51*b*. The first upper magnetic cover 511 is fixed on the first surface 41 of the circuit board 4. In addition, a portion of the first upper magnetic cover 511 is accommodated within the first concave structure 43. The first lower magnetic cover 512 is fixed on the second surface 42 of the circuit board 4. In addition, a portion of the first lower magnetic cover 512 is accommodated within the second concave structure.

The middle leg 513 is connected between the middle region of the first upper magnetic cover 511 and the middle region of the first lower magnetic cover 512. In addition, the middle leg 513 is penetrated through the first opening 44 of the circuit board 4. As shown in FIG. 1C, the middle leg 513 includes two sub-legs. One sub-leg of the middle leg 513 is connected with the first upper magnetic cover 511. The other sub-leg of the middle leg 513 is connected with the first lower magnetic cover 512. In another embodiment, the middle leg 513 has an integral leg structure that is connected with the first upper magnetic cover 511 or the first lower magnetic cover 512.

The first lateral leg 514 and the second lateral leg 515 are located beside two opposite sides of the middle leg 513. The outer side of the first lateral leg 514 is the third lateral side 51*c* of the first magnetic core assembly 51. The first lateral leg 514 runs through the second opening 45 of the circuit board 4. As shown in FIG. 1C, the first lateral leg 514 includes two sub-legs. One sub-leg of the first lateral leg 514 is connected with the first upper magnetic cover 511. The other sub-leg of the first lateral leg 514 is connected with the first lower magnetic cover 512. In another embodiment, the first magnetic leg 514 has an integral leg structure that is connected with the first upper magnetic cover 511 or the first lower magnetic cover 512.

The outer side of the second lateral leg 515 is the fourth lateral side 51d of the first magnetic core assembly 51. In addition, the second lateral leg 515 runs through the third opening 46 of the circuit board 4. As shown in FIG. 1C, the second lateral leg 515 includes two sub-legs. One sub-leg of the first lateral leg 515 is connected with the first upper magnetic cover 511. The other sub-leg of the second lateral leg 515 is connected with the first lower magnetic cover 512. In another embodiment, the second magnetic leg 515 has an integral leg structure that is connected with the first upper magnetic cover 511 or the first lower magnetic cover 512.

The first channel 516 is arranged between the middle leg 513 and the first lateral leg 514. In addition, the first channel 516 runs through the first lateral side 51a and the second side 51b of the first magnetic core assembly 5. The second channel 517 is arranged between the middle leg 513 and the second lateral leg 515. In addition, the second channel 517 runs through the first lateral side 51a and the second lateral side 51b of the first magnetic core assembly 5.

The second magnetic element 6 is formed as the first output inductor Lo1 as shown in FIG. 2. As shown in FIG. 4, the second magnetic element 6 includes a second magnetic core assembly 61 and a second winding assembly 62. The second winding assembly 62 is disposed within the circuit board 4. Moreover, the second winding assembly 62 is formed by the conductor within the circuit board 4. The winding method of the second winding assembly 62 will be described later. In an embodiment, the second magnetic core assembly 61 is made of a low magnetic permeability material such as iron power or magnetic power with an air gap. Consequently, the saturation current can be achieved.

The second magnetic core assembly 61 is located beside the junction between the second lateral side 51b and the third lateral side 51c of the first magnetic core assembly 51. The second magnetic core assembly 61 includes a second upper magnetic cover 611, a second lower magnetic cover 612, a third lateral leg 613, a fourth lateral leg 614 and a third channel 615. It is noted that the installation position of the second magnetic core assembly 61 is not restricted. For example, in another embodiment, the second magnetic core assembly 61 is located beside the junction between the second lateral side 51b and the fourth lateral side 51d of the first magnetic core assembly 51. The second upper cover 611 is fixed on the first surface 41 of the circuit board 4. The second lower magnetic cover is fixed on the second surface 42 of the circuit board 4.

The third lateral leg 613 is located beside the junction between the second lateral side 51b and the third lateral side 51c of the first magnetic core assembly 51. The third lateral leg 613 is connected between the second upper magnetic cover 611 and the second lower magnetic cover 612. In addition, the third lateral leg 613 is penetrated through the fourth opening 47. As shown in FIG. 1C, the third lateral leg 613 includes two sub-legs. One sub-leg of the third lateral leg 613 is connected with the second upper magnetic cover 611. The other sub-leg of the third lateral leg 613 is connected with the second lower magnetic cover 612. In another embodiment, the third lateral leg 613 has an integral leg structure that is connected with the second upper magnetic cover 611 or the second lower magnetic cover 612.

The fourth lateral leg 614 is connected between the second upper magnetic cover 611 and the second magnetic cover 612. In addition, the fourth lateral leg 614 is located in the first notch 40a of the circuit board 4. As shown in FIG. 1C, the fourth lateral leg 614 includes two sub-legs. One sub-leg of the fourth lateral leg 614 is connected with the second upper magnetic cover 611. The other sub-leg of the fourth lateral leg 614 is connected with the second lower magnetic cover 612. In another embodiment, the fourth lateral leg 614 has an integral leg structure that is connected with the second upper magnetic cover 611 or the second lower magnetic cover 612.

The third channel 615 is arranged between the third lateral leg 613 and the fourth lateral leg 614. The extending direction of the third channel 615 and the extending direction of the first channel 516 are perpendicular to each other.

The third magnetic element 7 is formed as the second output inductor Lo2 as shown in FIG. 2. As shown in FIG. 4, the third magnetic element 7 includes a third magnetic core assembly 71 and a third winding assembly 72. The third winding assembly 72 is disposed within the circuit board 4. The winding method of the third winding assembly 72 will be described later. In an embodiment, the third magnetic core assembly 71 is made of a low magnetic permeability material such as iron power or magnetic power with an air gap. Consequently, the saturation current can be achieved.

The third magnetic core assembly 71 is located beside the junction between the first lateral side 51a and the third lateral side 51c of the first magnetic core assembly 51. The third magnetic core assembly 71 includes a third upper magnetic cover 711, a third lower magnetic cover 712, a fifth lateral leg 713, a sixth lateral leg 714 and a fourth channel 715. It is noted that the installation position of the third magnetic core assembly 71 is not restricted. For example, in another embodiment, the third magnetic core assembly 71 is located beside the junction between the first lateral side 51a and the fourth lateral side 51d of the first magnetic core assembly 51. The third upper magnetic cover 711 is disposed on the first surface 41 of the circuit board 4. The third lower magnetic cover 712 is disposed on the second surface 42 of the circuit board 4. The third upper magnetic cover 711 and the third lower magnetic cover 712 are fixed on the circuit board 4.

The fifth lateral leg 713 is located beside the junction between the first lateral side 51a and the third lateral side 51c of the first magnetic core assembly 51.

The fifth lateral leg 713 is connected between the third upper magnetic cover 711 and the third lower magnetic cover 712. In addition, the fifth lateral leg 713 is penetrated through the fifth opening 48. As shown in FIG. 1C, the fifth lateral leg 713 includes two sub-legs. One sub-leg of the fifth lateral leg 713 is connected with the third upper magnetic cover 711. The other sub-leg of the fifth lateral leg 713 is connected with the third lower magnetic cover 712. In another embodiment, the fifth lateral leg 713 has an integral leg structure that is connected with the third upper magnetic cover 711 or the third lower magnetic cover 712.

The sixth lateral leg 714 is connected between the third upper magnetic cover 711 and the third lower magnetic cover 712. In addition, the sixth lateral leg 714 is located in the second notch 40b of the circuit board 4. As shown in FIG. 1C, the sixth lateral leg 714 includes two sub-legs. One sub-leg of the sixth lateral leg 714 is connected with the third upper magnetic cover 711. The other sub-leg of the sixth lateral leg 714 is connected with the third lower magnetic cover 712. In another embodiment, the sixth lateral leg 714 has an integral leg structure that is connected with the third upper magnetic cover 711 or the third lower magnetic cover 712.

The fourth channel 715 is arranged between the fifth lateral leg 713 and the sixth lateral leg 714. The extending direction of the fourth channel 715 and the extending direction of the first channel 516 are perpendicular to each other.

Each of the first rectifying switch M11 and the second rectifying switch M12 as shown in FIG. 2 includes a plurality of switches connected in parallel, and the first rectifying switch M11 and the second rectifying switch M12 are integrated into at least one first rectifying switch module M1 (e.g., two first rectifying switch modules M1). The two first rectifying switch modules M1 are connected with each other in parallel. One of the two first rectifying switch modules M1 is disposed on the first surface 41 of the circuit board 4. The other of the two first rectifying switch modules M1 is disposed on the second surface 42 of the circuit board 4. The two first rectifying switch modules M1 are opposed to each other with respect to the circuit board 4. The two first rectifying switch modules M1 are located beside the first lateral side 51a of the first magnetic core assembly 51. For example, the two first rectifying switch modules M1 are located beside the first side of the middle leg 513 of the first magnetic core assembly 51 and located beside the third magnetic core assembly 71.

Similarly, each of the third rectifying switch M21 and the fourth rectifying switch M22 as shown in FIG. 2 includes a plurality of switches connected in parallel, and the third rectifying switch M21 and the fourth rectifying switch M22 are integrated into at least one second rectifying switch module M2 (e.g., two second rectifying switch modules M2). The two second rectifying switch modules M2 are connected with each other in parallel. One of the two second rectifying switch modules M2 is disposed on the first surface 41 of the circuit board 4. The other of the two second rectifying switch modules M2 is disposed on the second surface 42 of the circuit board 4. The two second rectifying switch modules M2 are opposed to each other with respect to the circuit board 4. The two second rectifying switch modules M2 are located beside the second lateral side 51b of the first magnetic core assembly 51. For example, the two second rectifying switch modules M2 are located beside the second side of the middle leg 513 of the first magnetic core assembly 51 and located beside the second magnetic core assembly 61.

The first rectifying switch module M1 and the second rectifying switch module M2 on the first surface 41 of the circuit board 4 are symmetric to each other with respect to the first magnetic core assembly 51. The first rectifying switch module M1 and the second rectifying switch module M2 on the second surface 42 of the circuit board 4 are symmetric to each other with respect to the first magnetic core assembly 51. The projection regions of the two first rectifying switch modules M1 on the first surface 41 of the circuit board 4 are overlapped with each other. The projection regions of the two second rectifying switch modules M2 on the first surface 41 of the circuit board 4 are overlapped with each other. A first solder pad (not shown) is disposed on the first surface 41 of the circuit board 4 and is connected with one first rectifying switch module M1. A second solder pad (not shown) is disposed on the second surface 42 of the circuit board 4 and is connected with another one first rectifying switch module M1. The first solder pad and the second solder pad are in mirror symmetry. A third solder pad (not shown) is disposed on the first surface 41 of the circuit board 4 and is connected with one second rectifying switch module M2. A fourth solder pad (not shown) is disposed on the second surface 42 of the circuit board 4 and is connected with another one second rectifying switch module M2. The third solder pad and the fourth solder pad are in mirror symmetry.

For reducing the wiring length, the drain terminal of the first rectifying switch M11 in the first rectifying switch module M1 is close to the first lateral side 51a of the first magnetic core assembly 51, and the source terminal of the first rectifying switch M11 in the first rectifying switch module M1 is away from the first lateral side 51a of the first magnetic core assembly 51. Similarly, the drain terminal of the second rectifying switch M12 in the first rectifying switch module M1 is close to the first lateral side 51a of the first magnetic core assembly 51, and the source terminal of the second rectifying switch M12 in the first rectifying switch module M1 is away from the first lateral side 51a of the first magnetic core assembly 51. The drain terminals of the third rectifying switch M21 and the fourth rectifying switch M22 in the second rectifying switch module M2 are close to the second lateral side 51b of the first magnetic core assembly 51. The source terminals of the third rectifying switch M21 and the fourth rectifying switch M22 in the second rectifying switch module M2 are away from the second lateral side 51b of the first magnetic core assembly 51.

The first capacitor C1, the second capacitor C2, the upper switch Q1 and the lower switch Q2 are disposed on the first surface 41 of the circuit boar 4. In addition, the first capacitor C1, the second capacitor C2, the upper switch Q1 and the lower switch Q2 are located beside the junction between the second lateral side 51b and the fourth lateral side 51d of the first magnetic core assembly 51.

In case that the power conversion module 1 includes a plurality of input capacitors Cin, some of the plurality of input capacitors Cin are disposed on the first surface 41 of the circuit board 4 and located beside the junction between the first lateral side 51a and the fourth lateral side 51d of the first magnetic core assembly 51. The other of the plurality of input capacitors Cin are disposed on the second surface 42 of the circuit board 4 and located beside the first lateral side 51a and the second lateral side 51b of the first magnetic core assembly 51.

In an embodiment, the thickness of the first upper magnetic cover 511 of the first magnetic core assembly 51 is equal to the distance between the top surface of the first rectifying switch module M1 and the first surface 41 of the circuit board 4 and the distance between the top surface of the second rectifying switch module M2 and the first surface 41 of the circuit board 4. As mentioned above, a portion of the first upper magnetic cover 511 of the first magnetic core assembly 51 is accommodated within the first concave structure 43 of the circuit board 4. Consequently, the distance between the top surface of the first upper magnetic cover 511 and the first surface 41 of the circuit board 4 is smaller than the distance between the top surface of the first rectifying switch module M1 and the first surface 41 of the circuit board 4 and smaller than the distance between the top surface of the second rectifying switch module M2 and the first surface 41 of the circuit board 4. When a heat sink (not shown) is disposed on the first surface 41 of the circuit board 4, the gap between the first rectifying switch module M1 and the heat sink (or the gap between the second rectifying switch module M2 and the heat sink) is smaller than the gap between the first magnetic core assembly 51 and the heat sink. Consequently, the thermal resistance between the first rectifying switch module M1 (or the second rectifying switch module M2) and the heat sink is effectively reduced. Moreover, since the mechanical pressure of the heat sink is difficult to be transferred to the first magnetic core assembly 51, the reliability of the first magnetic core assembly 51 is enhanced.

Please refer to FIG. 1B again. The power conversion module 1 further includes a positive output pad 81, six negative output pads 82, a positive input pad 83 and a plurality of signal pads 84.

The positive output pad 81 is used as the output positive terminals Vo+ as shown in FIG. 2. The positive output pad 81 is disposed on the second surface 42 of the circuit board 4. In addition, the positive output pad 81 is located beside the third lateral side 51c of the first magnetic core assembly 51 and arranged between the second magnetic core assembly 61 and the third magnetic core assembly 71.

The six negative output pads 82 are used as the output negative terminals Vo− as shown in FIG. 2. The six negative output pads 82 are disposed on the second surface 42 of the circuit board 4. Three of the six negative output pads 82 are arranged around three sides of the first rectifying switch module M1 and located near the source terminal of the first rectifying switch M11 and the source terminal of the second rectifying switch M12. The side of the first rectifying switch modules M1 beside the first magnetic core assembly 51 is not included in the above three sides of the first rectifying switch modules M1. The other three negative output pads 82 are arranged around three sides of the second rectifying switch module M2 and located near the source terminal of the third rectifying switch M21 and the source terminal of the fourth rectifying switch M22. The side of the second rectifying switch module M2 beside the first magnetic core assembly 51 is not included in the above three sides of the second rectifying switch module M2. In other words, one negative output pad 82, the first rectifying switch module M1, the first magnetic element 5, the second rectifying switch module M2 and another negative output pad 82 are sequentially arranged along a specified direction.

The positive input pad 83 is used as the input positive terminal Vin+ as shown in FIG. 2. The positive input pad 83 is disposed on the second surface 42 of the circuit board 4. The positive input pad 83 is located beside the junction between the first lateral side 51a and the fourth lateral side 51d of the first magnetic core assembly 51.

The plurality of signal pads 84 are used to transmit the control signals. The plurality of signal pads 84 are disposed on the second surface 42 of the circuit board 4. Some of the signal pads 84 are located beside the junction between the second lateral side 51b and the fourth lateral side 51d of the first magnetic core assembly 51. The others of the signal pads 84 are located beside the junction between the first lateral side 51a and the fourth lateral side 51d of the first magnetic core assembly 51, located beside the positive input pad 83, and arranged between the junction between the first lateral side 51a and the fourth lateral side 51d of the first magnetic core assembly 51.

The method of winding the first winding assembly 52 around the first magnetic core assembly 51, the method of winding the second winding assembly 62 around the second magnetic core assembly 61 and the method of winding the third winding assembly 72 around the third magnetic core assembly 71 are shown in FIG. 4. For succinctness, the first upper magnetic cover 511 of the first magnetic core assembly 51, the second upper magnetic cover 611 of the second magnetic core assembly 61 and the third upper magnetic cover 711 of the third magnetic core assembly 71 are not shown in FIG. 4. That is, only the first lower magnetic cover 512 of the first magnetic core assembly 51, the second lower magnetic cover 612 of the second magnetic core assembly 61 and the third lower magnetic cover 712 of the third magnetic core assembly 71 are shown in FIG. 4. In FIG. 4, the positions of the first rectifying switch M11, the second rectifying switch M12, the third rectifying switch M21, the fourth rectifying switch M22 and the output capacitor Co relative to the first magnetic core assembly 51 are shown. The first rectifying switch M11 and the second rectifying switch M12 are located beside the first lateral side 51a of the first magnetic core assembly 51. The third rectifying switch M21 and the fourth rectifying switch M22 are located beside the second lateral side 51b of the first magnetic core assembly 51. The second magnetic core assembly 61 is located beside the junction between the second lateral side 51b and the third lateral side 51c of the first magnetic core assembly 51. The third magnetic core assembly 71 is located beside the junction between the first lateral side 51a and the third lateral side 51c of the first magnetic core assembly 51.

As shown in FIG. 4, the first winding assembly 52 includes the primary winding NP, the first secondary winding NS11, the second secondary winding NS12, the third secondary winding NS21 and the fourth secondary winding NS22.

The first terminal of the primary winding NP is located beside the second lateral side 51b of the first magnetic core assembly 51. In addition, the first terminal of the primary winding NP is electrically connected with the midpoint A of the switch bridge arm 21 as shown in FIG. 2. The second terminal of the primary winding NP is located beside the second lateral side 51b of the first magnetic core assembly 51. In addition, the second terminal of the primary winding NP is electrically connected with the midpoint B of the capacitor bridge arm 22 as shown in FIG. 2. From the first terminal to the second terminal, the primary winding NP is sequentially transferred through the second lateral side 51b of the first magnetic core assembly 51, the second channel 517, the first lateral side 51a of the first magnetic core assembly 51, the first channel 516 and the second lateral side 51b of the first magnetic core assembly 51. That is, from the first terminal to the second terminal, the primary winding NP is wound around the middle leg 513 of the first magnetic core assembly 51 along a clockwise direction. Moreover, the primary winding NP is wound for one turn.

The first terminal of the first secondary winding NS11 is located beside the first lateral side 51a of the first magnetic core assembly 51. In addition, the first terminal of the first secondary winding NS11 is electrically connected with the drain terminal of the first rectifying switch M11. The second terminal of the first secondary winding NS11 is located beside the second lateral side 51b of the first magnetic core assembly 51. From the first terminal to the second terminal, the first secondary winding NS11 is sequentially transferred through the first lateral side 51a of the first magnetic core assembly 51, the second channel 517 and the second lateral side 51b of the first magnetic core assembly 51. The first terminal of the second secondary winding NS12 is located beside the first lateral side 51a of the first magnetic core assembly 51. In addition, the first terminal of the second secondary winding NS12 is electrically connected with the drain terminal of the second rectifying switch M12. The second terminal of the second secondary winding NS12 is located beside the second lateral side 51b of the first magnetic core assembly 51. In addition, the second terminal of the second secondary winding NS12 is electrically connected with the second terminal of the first secondary winding NS11. From the first terminal to the second terminal, the second secondary winding NS12 is sequentially transferred through the first lateral side 51a of the first magnetic core assembly 51, the first channel 516 and the second lateral side 51b of the first magnetic core assembly 51. As mentioned above, the first secondary winding NS11 and the second secondary winding NS12 are connected with each other and collaboratively formed as a first secondary winding assembly. From the first terminal to the second terminal, the first secondary winding NS11 is wound around the middle leg 513 of the first magnetic core assembly 51 along a first direction. From the first terminal to the second terminal, the second secondary winding NS12 is wound around the middle leg 513 of the first magnetic core assembly 51 along a second direction. The first direction and the second direction are opposite. For example, the first direction is a counterclockwise direction, and the second direction is a clockwise direction. Moreover, each of the first secondary winding NS11 and the second secondary winding NS12 is wound for 0.5 turn.

The first terminal of the third secondary winding NS21 is located beside the second lateral side 51b of the first magnetic core assembly 51. In addition, the first terminal of the third secondary winding NS21 is electrically connected with the drain terminal of the third rectifying switch M21. The second terminal of the third secondary winding NS21 is located beside the first lateral side 51a of the first magnetic core assembly 51. From the first terminal to the second terminal, the third secondary winding NS21 is sequentially transferred through the second lateral side 51b of first magnetic core assembly 51, the first channel 516 and the first lateral side 51a of the first magnetic core assembly 51. The first terminal of the fourth secondary winding NS22 is located beside the second lateral side 51b of the first magnetic core assembly 51. In addition, the first terminal of the fourth secondary winding NS22 is electrically connected with the drain terminal of the fourth rectifying switch M22. The second terminal of the fourth secondary winding NS22 is located beside the first lateral side 51a of the first magnetic core assembly 51. In addition, the second terminal of the fourth secondary winding NS22 is electrically connected with the second terminal of the third secondary winding NS21. From the first terminal to the second terminal, the fourth secondary winding NS22 is sequentially transferred through the second lateral side 51b of the first magnetic core assembly 51, the second channel 517 and the first lateral side 51a of the first magnetic core assembly 51. As mentioned above, the third secondary winding NS21 and the fourth secondary winding NS22 are connected with each other and collaboratively formed as a second secondary winding assembly. From the first terminal to the second terminal, the third secondary winding NS21 is wound around the middle leg 513 of the first magnetic core assembly 51 along a first direction. From the first terminal to the second terminal, the fourth secondary winding NS22 is wound around the middle leg 513 of the first magnetic core assembly 51 along a second direction. The first direction and the second direction are opposite. For example, the first direction is a counterclockwise direction, and the second direction is a clockwise direction. Moreover, each of the third secondary winding NS21 and the fourth secondary winding N22 is wound for 0.5 turn.

During the operation of the power conversion module 1, a first magnetic flux is generated by the first secondary winding NS11 and applied to the middle leg 513 of the first magnetic core assembly 51, a second magnetic flux is generated by the second secondary winding NS12 and applied to the middle leg 513 of the first magnetic core assembly 51, a third magnetic flux is generated by the third secondary winding NS21 and applied to the middle leg 513 of the first magnetic core assembly 51, and a fourth magnetic flux is generated by the fourth secondary winding N22 and applied to the middle leg 513 of the first magnetic core assembly 51. The direction of the first magnetic flux and the direction of the second magnetic flux are opposite. The direction of the third magnetic flux and the direction of the fourth magnetic flux are opposite. The direction of the first magnetic flux and the direction of the third magnetic flux are identical. The direction of the second magnetic flux and the direction of the fourth magnetic flux are identical.

The first terminal of the second winding assembly 62 is located beside the junction between the second lateral side 51b and the third lateral side 51c of the first magnetic core assembly 51 and electrically connected to the first winding midpoint (i.e., a connection point of the second terminal of the first secondary winding NS11 and the second terminal of the second secondary winding NS12). The second terminal of the second secondary winding assembly 62 is electrically connected to the output positive terminal Vo+ as shown in FIG. 2. The second winding assembly 62 is transferred through the third channel 615 of the second magnetic core assembly 51. The first terminal of the third winding assembly 72 is located beside the junction between the first lateral 51a and the third lateral side 51c of the first magnetic core assembly 51 and electrically connected to the second winding midpoint (i.e., a connection point of the second terminal of the third secondary winding NS21 and the second terminal of the fourth secondary winding NS22). The second terminal of the third winding assembly 72 is electrically connected to the output positive terminal Vo+ and the second terminal of the second winding assembly 62. The third winding assembly 72 is transferred through the fourth channel 715 of the third magnetic core assembly 71. The second magnetic element 6 and the third magnetic element 7 are close to the first lateral leg 514 and away from the second lateral leg 515. Each of the second magnetic core assembly 61 and the third magnetic core assembly 71 is made of a low magnetic permeability material such as iron power or magnetic power with an air gap. Consequently, the larger saturation current can be achieved.

As mentioned above, the methods of winding the primary winding NP, the first secondary winding NS11, the second secondary winding NS12, the third secondary winding NS21 and the fourth secondary winding NS22 are specially designed. In addition, each of the first secondary winding NS11, the second secondary winding NS12, the third secondary winding NS21 and the fourth secondary winding NS22 is wound for 0.5 turn. In other words, the first secondary winding NS11, the second secondary winding NS12, the third secondary winding NS21 and the fourth secondary winding NS22 are not very long. Since the parasitic resistance between the primary winding NP and the secondary windings is reduced, the DC loss in the region between the primary winding NP and the secondary windings is reduced.

As shown in FIG. 4, the primary winding NP, the first secondary winding assembly (i.e., the first secondary winding NS11 and the second secondary winding NS12) and the second secondary winding assembly (i.e., the third secondary winding NS21 and the fourth secondary winding NS22) are disposed on different trace layers of the circuit board 4. In an embodiment, the primary winding NP has a first projection region on the first surface 21 of the circuit board 2, the first secondary winding assembly has a second projection region on the first surface 21 of the circuit board 2, and the second secondary winding assembly has a third projection region on the first surface 21 of the circuit board 2. The area of the overlap region between the first projection region and the second projection region is greater than 50% of the area of the first projection region and/or greater than 50% of the area of the second projection region. Similarly, the area of the overlap region between the first projection region and the third projection region is greater than 50% of the area of the first projection region and/or greater than 50% of the area of the third projection region.

In an embodiment, each of the first secondary winding assembly and the second secondary winding assembly is implemented with a plurality of trace layers connected in parallel in the circuit board 2. At least one of the plurality of trace layers of the second secondary winding assembly is arranged between at least two of the plurality of trace layers of the first secondary winding assembly. In addition, the trace layer of the primary winding NP is arranged between any two trace layers of the first secondary winding assembly and the second secondary winding assembly. In other words, the primary winding NP, the first secondary winding NS11, the second secondary winding NS12, the third secondary winding NS21 and the fourth secondary winding NS22 are arranged in a staggered form. Consequently, the AC loss between the primary winding NP and the secondary winding assemblies will be further reduced.

As mentioned above, the rectifying switches (i.e., the first rectifying switch M11 and the second rectifying switch M12) of the first rectifying circuit 31 and the rectifying switches (i.e., the third rectifying switch M21 and the fourth rectifying switch M22) of the second rectifying circuit 32 are located at two opposite sides of the first magnetic core assembly 51. Since the spaces at the two sides of the first magnetic core assembly 51 are effectively utilized, the parasitic resistance and the conduction loss of the rectifying switches are reduced.

As mentioned above, the first output inductor Lo1 of the first rectifying circuit 31 and the second output inductor Lo2 of the second rectifying circuit 32 are located beside two junctions of the first magnetic core assembly 51. Since the spaces at the two sides of the first magnetic core assembly 51 are effectively utilized, the parasitic resistance and the power loss of the first output inductor Lo1 and the second output inductor Lo2 are reduced.

Please refer to FIG. 3 again. In the time interval between the t=0 and t0, the upper switch Q1 of the switch bridge arm 21, the first rectifying switch M11 and the third rectifying switch M21 are in the on state. In the time interval between the t1 and t2, the lower switch Q2 of the switch bridge arm 21, the second rectifying switch M12 and the fourth rectifying switch M22 are in the on state. The primary winding NP, the first secondary winding NS11 and the fourth secondary winding NS22 are disposed within the circuit board 4 in a staggered form. The primary winding NP, the second secondary winding NS12 and the third secondary winding NS21 are disposed within the circuit board 4 in a staggered form. Consequently, the AC loss of the windings NP, NS11, NS12, NS21 and NS22 will be reduced.

As shown in FIG. 4, each of the first secondary winding NS11, the second secondary winding NS12, the third secondary winding NS21 and the fourth secondary winding NS22 is wound for 0.5 turn. The first rectifying circuit 31 (i.e., the first rectifying switch M11 and the second rectifying switch M12) and the first output inductor Lo1 are located beside two opposite sides of the first magnetic core assembly 51. The second rectifying circuit 32 (i.e., the third rectifying switch M21 and the fourth rectifying switch M22) and the second output inductor Lo2 are located beside two opposite sides of the first magnetic core assembly 51. Consequently, the line between the center position of the two rectifying switches of the first rectifying circuit 31 and the first output inductor Lo1 and the line between the center position of the two rectifying switches of the second rectifying circuit 32 and the second output inductor Lo2 intersect each other.

In some other embodiments, each of the first secondary winding NS11, the second secondary winding NS12, the third secondary winding NS21 and the fourth secondary winding NS22 is wound for 1 turn. The first rectifying circuit 31 (i.e., the first rectifying switch M11 and the second rectifying switch M12) and the first output inductor Lo1 are located beside the same side of the first magnetic core assembly 51. The second rectifying circuit 32 (i.e., the third rectifying switch M21 and the fourth rectifying switch M22) and the second output inductor Lo2 are located beside the same side of the first magnetic core assembly 51. Consequently, the line between the center position of the two rectifying switches of the first rectifying circuit 31 and the first output inductor Lo1 and the line between the center position of the two rectifying switches of the second rectifying circuit 32 and the second output inductor Lo2 are in parallel with each other. Moreover, the first rectifying switch module M1 (i.e., the first rectifying switch M11 and the second rectifying switch M12) and the second rectifying switch module M2 (i.e., the third rectifying switch M21 and the fourth rectifying switch M22) are symmetric to each other with respect to the first magnetic core assembly 51. The first output inductor Lo1 and the second output inductor Lo2 are symmetric to each other with respect to the first magnetic core assembly 51. The first output inductor Lo1 and the first winding midpoint are located beside the same side of the first magnetic core assembly 51. The second output inductor Lo2 and the second winding midpoint are located beside the same side of the second magnetic core assembly 51.

Figure 5:
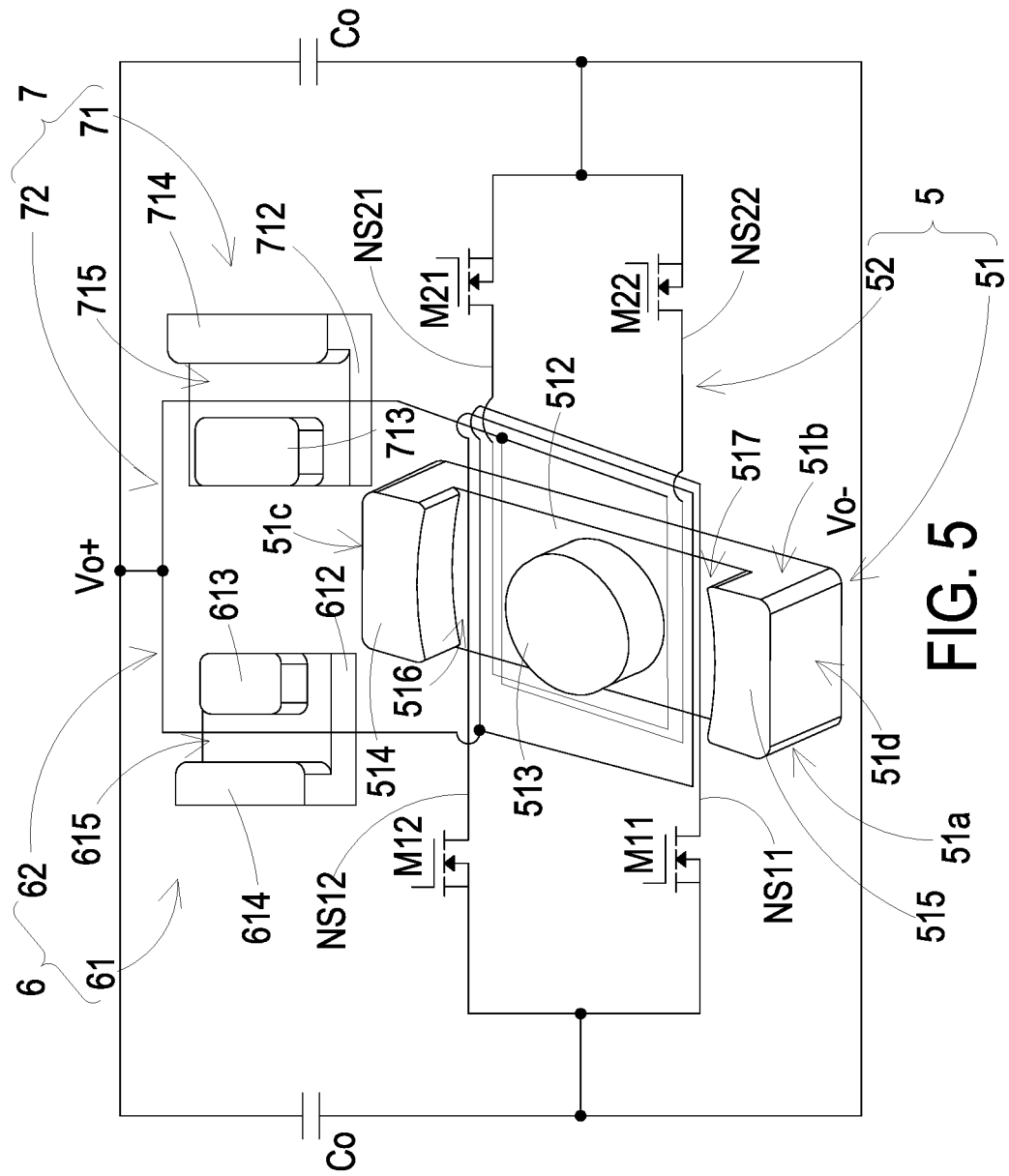
FIG. 5 schematically illustrates magnetic core assemblies and winding assemblies in a power conversion module according to another embodiment of the present disclosure, in which the upper magnetic covers are not shown.

FIG. 5 schematically illustrates magnetic core assemblies and winding assemblies in a power conversion module according to another embodiment of the present disclosure, in which the upper magnetic covers are not shown. The positions of the first terminals of the first secondary winding NS11, the second secondary winding NS12, the third secondary winding NS21 and the fourth secondary winding NS22 as shown in FIG. 5 of this embodiment are identical to those as shown in FIG. 4.

The first terminal and the second terminal of the first secondary winding NS11 are located beside the first lateral side 51a of the first magnetic core assembly 51. From the first terminal to the second terminal, the first secondary winding NS11 is sequentially transferred through the first lateral side 51a of the first magnetic core assembly 51, the second channel 517, the second lateral side 51b of the first magnetic core assembly 51, the first channel 516 and the first lateral side 51a of the first magnetic core assembly 51. The first terminal and the second terminal of the second secondary winding NS12 are located beside the first lateral side 51a of the first magnetic core assembly 51. From the first terminal to the second terminal, the second secondary winding NS12 is sequentially transferred through the first lateral side 51a of the first magnetic core assembly 51, the first channel 516, the second lateral side 51b of the first magnetic core assembly 51, the second channel 517 and the first lateral side 51a of the first magnetic core assembly 51. Moreover, each of the first secondary winding NS11 and the second secondary winding NS12 is wound for 1 turn.

The first terminal and the second terminal of the third secondary winding NS21 are located beside the second lateral side 51b of the first magnetic core assembly 51. From the first terminal to the second terminal, the third secondary winding NS21 is sequentially transferred through the second lateral side 51b of first magnetic core assembly 51, the first channel 516, the first lateral side 51a of the first magnetic core assembly 51, the second channel 517 and the second lateral side 51b of first magnetic core assembly 51. The first terminal and the second terminal of the fourth secondary winding NS22 are located beside the second lateral side 51b of the first magnetic core assembly 51. From the first terminal to the second terminal, the fourth secondary winding NS22 is sequentially transferred through the second lateral side 51b of the first magnetic core assembly 51, the second channel 517, the first lateral side 51a of the first magnetic core assembly 51, the first channel 516 and the second lateral side 51b of the first magnetic core assembly 51. Moreover, each of the third secondary winding NS21 and the fourth secondary winding NS22 is wound for 1 turn.

The first output capacitor Lo1 is disposed on the circuit board 4. In addition, the first output capacitor Lo1 is located beside the junction between the first lateral side 51a and the third lateral side 51c of the first magnetic core assembly 51 or located beside the junction between the first lateral side 51a and the fourth lateral side 51d of the first magnetic core assembly 51. The second output capacitor Lo2 is disposed on the circuit board 4. In addition, the second output capacitor Lo2 is located beside the junction between the second lateral side 51b and the third lateral side 51c of the first magnetic core assembly 51 or located beside the junction between the second lateral side 51b and the fourth lateral side 51d of the first magnetic core assembly 51.

It is noted that numerous modifications may be made while retaining the teachings of the present disclosure. In another embodiment, the power conversion module includes the first secondary circuit (i.e., the first secondary winding NS11, the second secondary winding NS12 and the first rectifying circuit 31), but the power conversion module does not include the second secondary circuit. Consequently, the volume of the power conversion module is reduced, and the integration of the power conversion module is increased. Moreover, each secondary winding of the secondary circuit is wound for one turn. Moreover, the rectifying switches in the rectifying circuit of the secondary circuit and the output inductor are located beside the same side of the first magnetic core assembly.

In an embodiment, the power conversion module 1 and a load are disposed on a system board. The load is electrically connected with the output positive terminal Vo+ and the output negative terminal Vo− of the power conversion module 1. The load receives the output power from the power conversion module 1. In another embodiment, the circuit board 4 of the power conversion module 1 is integrated into a system board of an electronic device. The other electronic components of the power conversion module 1 are also disposed on the system board. The load is also disposed on the system board. The load is electrically connected with the output positive terminal Vo+ and the output negative terminal Vo− of the power conversion module 1. The load receives the output power from the power conversion module 1. For example, the load is a CPU, a GPU or an ASIC.

From the above descriptions, the present disclosure provides a power conversion module. The magnetic core assemblies and the winding assemblies of the transformer, the first output inductor and the second output inductor in the power conversion module are specially designed. Consequently, the voltage reduction functions of the transformer can be achieved. For example, the input voltage with high power (e.g., a 48V input voltage) is decreased to the output voltage with low power (e.g., 2.2V output voltage). Moreover, the volume of the power conversion module is effectively reduced, and the integration of the power conversion module is enhanced. Consequently, the power conversion module has the advantages of low output ripple, small volume, high efficiency and simplified applications. Moreover, due to the arrangement of the output inductors and the output capacitor, the volt-second product withstood by the output inductors is largely reduced. Moreover, the inductors with the smaller inductance can be used as the output inductors to suppress the current ripple. Consequently, the load dynamic response speed of the power conversion module is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion module, comprising:
an input positive terminal, an input negative terminal, an output positive terminal and an output negative terminal, wherein the output positive terminal and the output negative terminal are electrically connected with a low-voltage and high-current load, the power conversion module receives an input voltage through the input positive terminal and the input negative terminal, and an output voltage is outputted from the output positive terminal and the output negative terminal to drive the low-voltage and high-current load;
a first bridge arm electrically connected between the input positive terminal and the input negative terminal;
a second bridge arm electrically connected between the input positive terminal and the input negative terminal, wherein the first bridge arm and the second bridge arm are connected with each other in parallel;
a transformer comprising a first magnetic core assembly, a primary winding, a first secondary winding and a second secondary winding, wherein a first terminal of the primary winding is electrically connected with a midpoint of the first bridge arm, a second terminal of the primary winding is electrically connected with a midpoint of the second bridge arm, and a second terminal of the first secondary winding and a second terminal of the second secondary winding are electrically connected with a first winding midpoint; and
a first rectifying circuit comprising a first rectifying switch, a second rectifying switch and a first output inductor, wherein a drain terminal of the first rectifying switch is electrically connected with a first terminal of the first secondary winding, a drain terminal of the second rectifying switch is electrically connected with a first terminal of the second secondary winding, a source terminal of the first rectifying switch and a source terminal of the second rectifying switch are connected with each other and electrically connected with the output negative terminal, and the first output inductor is electrically connected between the first winding midpoint and the output positive terminal, wherein a magnitude of the input voltage is higher than 40V, and a magnitude of the output voltage is lower than or equal to 2.2V, wherein the first magnetic core assembly comprises a middle leg, the first secondary winding is wound around the middle leg of the first magnetic core assembly along a first direction from the first terminal of the first secondary winding to the second terminal of the first secondary winding, and the second secondary winding is wound around the middle leg of the first magnetic core assembly along a second direction from the first terminal of the second secondary winding to the second terminal of the second secondary winding; and wherein the first direction and the second direction are opposite to each other.

2. The power conversion module according to claim 1, wherein a magnitude of the output voltage is lower than or equal to 1.2V, and a rated current outputted from the output positive terminal and the output negative terminal is higher than or equal to 50 A.

3. The power conversion module according to claim 1, wherein the power conversion circuit further comprises a circuit board, and the transformer further comprises a first magnetic core assembly, wherein the circuit board comprises a first surface and a second surface, and the first magnetic core assembly is disposed on the circuit board, wherein the first surface and the second surface are opposed to each other, and the first magnetic core assembly further comprises a first lateral side, a second lateral side, a third lateral side, a fourth lateral side, an upper magnetic cover, a lower magnetic cover, a first lateral leg, a second lateral leg, a first channel and a second channel, wherein the first lateral side and the second lateral side are opposed to each other, the third lateral side and the fourth lateral side are opposed to each other, and the third lateral side and the fourth lateral side are arranged between the first lateral side and the second lateral side, wherein the upper magnetic cover and the lower magnetic cover are disposed on the circuit board, the middle leg is connected between the upper magnetic cover and the lower magnetic cover, the first lateral leg and the second lateral leg are respectively located beside two opposite sides of the middle leg, the first channel is arranged between the middle leg and the first lateral leg, the second channel is arranged between the middle leg and the second lateral leg, and the first magnetic core assembly is made of a high magnetic permeability material.

4. The power conversion module according to claim 3, wherein the first secondary winding is a first conductor formed in the circuit board, the first terminal of the first secondary winding is located beside the first lateral side of the first magnetic core assembly, wherein the second secondary winding is a second conductor formed in the circuit board, the first terminal of the second secondary winding is located beside the first lateral side of the first magnetic core assembly, and the first secondary winding and the second secondary winding are collaboratively formed as a first secondary winding assembly.

5. The power conversion module according to claim 4, wherein the second terminal of the first secondary winding is located beside the second lateral side of the first magnetic core assembly, and the first secondary winding is sequentially transferred through the first lateral side of the first magnetic core assembly, the second channel and the second lateral side of the first magnetic core assembly from the first terminal of the first secondary winding to the second terminal of the first secondary winding, wherein the second terminal of the second secondary winding is located beside the second lateral side of the first magnetic core assembly, and the second secondary winding is sequentially transferred through the first lateral side of the first magnetic core assembly, the first channel and the second lateral side of the first magnetic core assembly from the first terminal of the second secondary winding to the second terminal of the second secondary winding, wherein each of the first secondary winding and the second secondary winding is wound for 0.5 turn, wherein the first output inductor is disposed on the circuit board, wherein the first output inductor is located beside a junction between the second lateral side and the third lateral side of the first magnetic core assembly, or the first output inductor is located beside a junction between the second lateral side and the fourth lateral side of the first magnetic core assembly.

6. The power conversion module according to claim 4, wherein the second terminal of the first secondary winding is located beside the first lateral side of the first magnetic core assembly, and the first secondary winding is sequentially transferred through the first lateral side of the first magnetic core assembly, the second channel, the second lateral side of the first magnetic core assembly, the first channel and the first lateral side of the first magnetic core assembly from the first terminal of the first secondary winding to the second terminal of the first secondary winding, wherein the second terminal of the second secondary winding is located beside the first lateral side of the first magnetic core assembly, and the second secondary winding is sequentially transferred through the first lateral side of the first magnetic core assembly, the first channel, the second lateral side of the first magnetic core assembly, the second channel and the first lateral side of the first magnetic core assembly from the first terminal of the second secondary winding to the second terminal of the second secondary winding, wherein each of the first secondary winding and the second secondary winding is wound for 1 turn, wherein the first output inductor is disposed on the circuit board, wherein the first output inductor is located beside a junction between the first lateral side and the third lateral side of the first magnetic core assembly or located beside a junction between the first lateral side and the fourth lateral side of the first magnetic core assembly.

7. The power conversion module according to claim 4, wherein the first rectifying switch and the second rectifying switch are disposed on the circuit board and located beside the first lateral side of the first magnetic core assembly, wherein the drain terminal of the first rectifying switch is closer to the first lateral side of the first magnetic core assembly than the source terminal of the first rectifying switch, and the drain terminal of the second rectifying switch is closer to the first lateral side of the first magnetic core assembly than the source terminal of the second rectifying switch.

8. The power conversion module according to claim 4, wherein the transformer further comprises a third secondary winding and a fourth secondary winding, the power conversion module further comprises a second rectifying circuit, and the second rectifying circuit comprises a third rectifying switch, a fourth rectifying switch and a second output inductor, wherein a second terminal of the third secondary winding and a second terminal of the fourth secondary winding are electrically connected with a second winding midpoint, a drain terminal of the third rectifying switch is electrically connected with a first terminal of the third secondary winding, a drain terminal of the fourth rectifying switch is electrically connected with a first terminal of the fourth secondary winding, a source terminal of the third rectifying switch and a source terminal of the fourth rectifying switch are connected with each other and electrically connected with the output negative terminal, the second output inductor is electrically connected between the second winding midpoint and the output positive terminal, and the third secondary winding and the fourth secondary winding are collaboratively formed as a second secondary winding assembly.

9. The power conversion module according to claim 8, wherein the third secondary winding is a third conductor formed in the circuit board, the first terminal of the third secondary winding is located beside the second lateral side of the first magnetic core assembly, and the third secondary winding is wound around the middle leg of the first magnetic core assembly along the first direction from the first terminal of the third secondary winding to the second terminal of the third secondary winding, wherein the fourth secondary winding is a fourth conductor formed in the circuit board, the first terminal of the fourth secondary winding is located beside the second lateral side of the first magnetic core assembly, and the fourth secondary winding is wound around the middle leg of the first magnetic core assembly along the second direction from the first terminal of the fourth secondary winding to the second terminal of the fourth secondary winding.

10. The power conversion module according to claim 9, wherein the second terminal of the third secondary winding is located beside the first lateral side of the first magnetic core assembly, and the third secondary winding is sequentially transferred through the second lateral side of the first magnetic core assembly, the first channel and the first lateral side of the first magnetic core assembly from the first terminal of the third secondary winding to the second terminal of the third secondary winding, wherein the second terminal of the fourth secondary winding is located beside the first lateral side of the first magnetic core assembly, and the fourth secondary winding is sequentially transferred through the second lateral side of the first magnetic core assembly, the second channel and the first lateral side of the first magnetic core assembly from the first terminal of the fourth secondary winding to the second terminal of the fourth secondary winding, wherein each of the third secondary winding and the fourth secondary winding is wound for 0.5 turn, wherein the second output inductor is disposed on the circuit board, wherein the second output inductor is located beside a junction between the first lateral side and the third lateral side of the first magnetic core assembly, or the second output inductor is located beside a junction between the first lateral side and the fourth lateral side of the first magnetic core assembly.

11. The power conversion module according to claim 9, wherein the second terminal of the third secondary winding is located beside the second lateral side of the first magnetic core assembly, and the third secondary winding is sequentially transferred through the second lateral side of the first magnetic core assembly, the first channel, the first lateral side of the first magnetic core assembly, the second channel and the second lateral side of the first magnetic core assembly from the first terminal of the third secondary winding to the second terminal of the third secondary winding, wherein the second terminal of the fourth secondary winding is located beside the second lateral side of the first magnetic core assembly, and the fourth secondary winding is sequentially transferred through the second lateral side of the first magnetic core assembly, the second channel, the first lateral side of the first magnetic core assembly, the first channel and the second lateral side of the first magnetic core assembly from the first terminal of the fourth secondary winding to the second terminal of the fourth secondary winding, wherein each of the third secondary winding and the fourth secondary winding is wound for 1 turn, wherein the second output inductor is disposed on the circuit board, wherein the second output inductor is located beside a junction between the second lateral side and the third lateral side of the first magnetic core assembly, or the second output inductor is located beside a junction between the second lateral side and the fourth lateral side of the first magnetic core assembly.

12. The power conversion module according to claim 9, wherein the third rectifying switch and the fourth rectifying switch are disposed on the circuit board and located beside the second lateral side of the first magnetic core assembly, wherein the drain terminal of the third rectifying switch is closer to the second lateral side of the first magnetic core assembly than the source terminal of the third rectifying switch, and the drain terminal of the fourth rectifying switch is closer to the second lateral side of the first magnetic core assembly than the source terminal of the fourth rectifying switch.

13. The power conversion module according to claim 8, wherein the first rectifying switch and the second rectifying switch are integrated into a first rectifying switch module, and the third rectifying switch and the fourth rectifying switch are integrated into a second rectifying switch module, wherein the first rectifying switch module and the second rectifying switch module are symmetric to each other with respect to the first magnetic core assembly and located beside the middle leg of the first magnetic core assembly, the first output inductor and the second output inductor are symmetric to each other with respect to the first magnetic core assembly and located beside the first lateral leg or the second lateral leg of the first magnetic core assembly, wherein the first output inductor and the first winding midpoint are located beside a same side of the first magnetic core assembly, and the second output inductor and the second winding midpoint are located beside a same side of the first magnetic core assembly.

14. The power conversion module according to claim 13, wherein the power conversion module further comprises a plurality of negative output pads, wherein a first one of the plurality of negative output pads, the first rectifying switch module, the first magnetic element, the second rectifying switch module and a second one of the plurality of negative output pads are sequentially arranged along a specified direction, wherein the power conversion module further comprises a positive output pad, and the positive output pad is arranged between the first output inductor and the second output inductor.

15. The power conversion module according to claim 8, wherein the primary winding has a first projection region on the first surface of the circuit board, the first secondary winding assembly has a second projection region on the first surface of the circuit board, and the second secondary winding assembly has a third projection region on the first surface of the circuit board, wherein an area of an overlap region between the first projection region and the second projection region is greater than 50% of an area of the first projection region and/or greater than 50% of an area of the second projection region, and an area of an overlap region between the first projection region and the third projection region is greater than 50% of the area of the first projection region and/or greater than 50% of an area of the third projection region.

16. The power conversion module according to claim 8, wherein the primary winding, the first secondary winding assembly and the second secondary winding assembly are disposed within the circuit board and arranged in a staggered form, wherein the first bridge arm is a switch bridge arm comprising an upper switch and a lower switch, wherein the upper switch, the first rectifying switch and the third rectifying switch are in an on state in a first time interval of a switching cycle, and the lower switch, the second rectifying switch and the fourth rectifying switch are in the on state in a second time interval of the switching cycle, wherein the primary winding, the first secondary winding and the fourth secondary winding are disposed within the circuit board and arranged in a staggered form, and the primary winding, the second secondary winding and the third secondary winding are disposed within the circuit board and arranged in a staggered form.

17. The power conversion module according to claim 8, wherein the first output inductor comprises a second magnetic core assembly, and the second output inductor comprises a third magnetic core assembly, wherein each of the second magnetic core assembly and the third magnetic core assembly is made of a low magnetic permeability material, wherein the power conversion module comprises at least two first rectifying switch modules and at least two second rectifying switch modules, wherein a first one and a second one of the at least two first rectifying switch modules are respectively disposed on the first surface of the circuit board and the second surface of the circuit board, and the first one and the second one of the at least two first rectifying switch modules are overlapped with each other with respect to the first surface of the circuit board, wherein a first one and a second one of the at least two second rectifying switch modules are respectively disposed on the first surface of the circuit board and the second surface of the circuit board, and the first one and the second one of the at least two second rectifying switch modules are overlapped with each other with respect to the first surface of the circuit board.

18. The power conversion module according to claim 3, wherein the circuit board further comprises a concave structure, wherein the concave structure is concavely formed in the first surface of the circuit board, a portion of the upper magnetic cover is accommodated within the concave structure, and a distance between a top surface of the upper magnetic cover and the first surface of the circuit board is smaller than a distance between a top surface of the first rectifying switch or the second rectifying switch and the first surface of the circuit board.

19. The power conversion module according to claim 1, wherein the power conversion module further comprises an input capacitor, and the input capacitor is connected between the input positive terminal and the input negative terminal, wherein the first bridge arm is a switch bridge arm comprising a first upper switch and a first lower switch, and the first upper switch and the first lower switch are connected with the midpoint of the first bridge arm; wherein the second bridge arm is another switch bridge arm comprising a second upper switch and a second lower switch, and the second upper switch and the second lower switch are connected with the midpoint of the second bridge arm, or the second bridge arm is a capacitor bridge arm comprising a first capacitor and a second capacitor, and the first capacitor and the second capacitor are connected with the midpoint of the second bridge arm; and wherein the power conversion module further comprises an output capacitor, and the output capacitor is connected between the output positive terminal and the output negative terminal.

20. An electronic device, comprising
a power conversion module, comprising:
an input positive terminal, an input negative terminal, an output positive terminal and an output negative terminal, wherein the power conversion module receives an input voltage through the input positive terminal and the input negative terminal, and an output voltage is outputted from the output positive terminal and the output negative terminal;
a first bridge arm electrically connected between the input positive terminal and the input negative terminal;
a second bridge arm electrically connected between the input positive terminal and the input negative terminal, wherein the first bridge arm and the second bridge arm are connected with each other in parallel;
a transformer comprising a first magnetic core assembly, a primary winding, a first secondary winding and a second secondary winding, wherein a first terminal of the primary winding is electrically connected with a midpoint of the first bridge arm, a second terminal of the primary winding is electrically connected with a midpoint of the second bridge arm, and a second terminal of the first secondary winding and a second terminal of the second secondary winding are electrically connected with a first winding midpoint; and
a first rectifying circuit comprising a first rectifying switch, a second rectifying switch and a first output inductor, wherein a drain terminal of the first rectifying switch is electrically connected with a first terminal of the first secondary winding, a drain terminal of the second rectifying switch is electrically connected with a first terminal of the second secondary winding, a source terminal of the first rectifying switch and a source terminal of the second rectifying switch are connected with each other and electrically connected with the output negative terminal, and the first output inductor is electrically connected between the first winding midpoint and the output positive terminal,
wherein a magnitude of the input voltage is higher than 40V, and a magnitude of the output voltage is lower than or equal to 2.2V; and
a load electrically connected with the output positive terminal and the output negative terminal of the power conversion module and configured to receive the output voltage outputted from the output positive terminal and the output negative terminal,
wherein the first magnetic core assembly comprises a middle leg the first second winding is wound around the middle leg of the first magnetic core assembly along a first direction from the first terminal of the first secondary winding to the second terminal of the first secondary winding, and the second secondary winding is wound around the middle leg of the first magnetic core assembly along a second direction from the first terminal of the second secondary winding to the second terminal of the second secondary winding; and wherein the first direction and the second direction are opposite to each other.

* * * * *